US012418500B1

(12) United States Patent
Morris

(10) Patent No.: US 12,418,500 B1
(45) Date of Patent: *Sep. 16, 2025

(54) METHODS, SYSTEMS, AND COMPUTER PROGRAM PRODUCTS FOR PROCESSING A DATA OBJECT IDENTIFICATION REQUEST IN A COMMUNICATION

(71) Applicant: MOTION OFFENSE, LLC, Longview, TX (US)

(72) Inventor: Robert Paul Morris, Raleigh, NC (US)

(73) Assignee: Motion Offense, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/902,332

(22) Filed: Sep. 30, 2024

Related U.S. Application Data

(63) Continuation of application No. 18/663,016, filed on May 13, 2024, which is a continuation of application
(Continued)

(51) Int. Cl.
H04L 51/08 (2022.01)
G06F 3/0482 (2013.01)
(Continued)

(52) U.S. Cl.
CPC ............ *H04L 51/08* (2013.01); *G06F 3/0482* (2013.01); *G06F 9/451* (2018.02); *G06F 16/168* (2019.01);
(Continued)

(58) Field of Classification Search
CPC ....... H04L 51/08; H04L 51/18; H04L 51/234; H04L 67/306; H04L 67/02; H04L 51/48;
(Continued)

(56) References Cited

U.S. PATENT DOCUMENTS 8,825,597 B1 9/2014 Houston et al.
9,633,125 B1 4/2017 Garcia et al.
(Continued)

OTHER PUBLICATIONS

Papers from IPR2024-00286, Jun. 30, 2025.
(Continued)

*Primary Examiner* — Jungwon Chang
(74) *Attorney, Agent, or Firm* — Patrick E. Caldwell, Esq.; The Caldwell Firm, LLC

(57) ABSTRACT

Methods and systems are described for processing a data object identification request in a communication. In an aspect, a first communications agent in a first execution environment receives data object information identifying a data object matching criterion. The first communications agent exchanges a first message with a second communications agent in a second execution environment. The second communications agent detects a data object identification request included in the exchanged first message. In response to detecting the data object identification request, a data object identification response is generated that identifies a data object in a second data store in the second execution environment. The second communications agent exchanges a second message with the first communications agent. The second message includes the data object identification response, wherein the second message does not include the data object.

84 Claims, 15 Drawing Sheets

Related U.S. Application Data

No. 17/938,037, filed on Oct. 4, 2022, now Pat. No. 12,028,299, which is a continuation of application No. 17/187,621, filed on Feb. 26, 2021, now Pat. No. 11,611,520, which is a continuation of application No. 16/803,980, filed on Feb. 27, 2020, now Pat. No. 11,044,215, which is a continuation of application No. 15/984,406, filed on May 20, 2018, now Pat. No. 10,587,548, which is a continuation of application No. 15/724,223, filed on Oct. 3, 2017, now Pat. No. 10,021,052, which is a continuation-in-part of application No. 14/274,623, filed on May 9, 2014, now abandoned, which is a continuation-in-part of application No. 13/626,635, filed on Sep. 25, 2012, now abandoned, and a continuation-in-part of application No. 13/624,906, filed on Sep. 22, 2012, now abandoned.

(51) Int. Cl.
| | | |
|---|---|---|
| *G06F 9/451* | (2018.01) | |
| *G06F 16/16* | (2019.01) | |
| *G06Q 10/107* | (2023.01) | |
| *H04L 51/18* | (2022.01) | |
| *H04L 51/48* | (2022.01) | |
| *H04L 67/06* | (2022.01) | |
| *G06F 3/04817* | (2022.01) | |
| *H04L 51/234* | (2022.01) | |
| *H04L 51/42* | (2022.01) | |
| *H04L 51/52* | (2022.01) | |

(52) U.S. Cl.
CPC ........... *G06Q 10/107* (2013.01); *H04L 51/18* (2013.01); *H04L 51/48* (2022.05); *H04L 67/06* (2013.01); *G06F 3/04817* (2013.01); *G06F 2203/04803* (2013.01); *H04L 51/234* (2022.05); *H04L 51/42* (2022.05); *H04L 51/52* (2022.05)

(58) Field of Classification Search
CPC ......... H04L 51/42; H04L 51/52; H04L 67/06; G06F 16/168; G06F 3/0482; G06F 3/04817; G06F 9/451; G06F 2203/04803; G06Q 10/107
USPC ...................................................... 715/752
See application file for complete search history.

(56) References Cited

U.S. PATENT DOCUMENTS

| | | | | |
|---|---|---|---|---|
| 2006/0101127 | A1* | 5/2006 | Brown | G09B 5/06 709/206 |
| 2007/0011246 | A1 | 1/2007 | Wu | |
| 2007/0100991 | A1* | 5/2007 | Daniels | H04L 51/234 709/224 |
| 2008/0114844 | A1* | 5/2008 | Sanchez | H04L 67/75 709/206 |
| 2008/0162651 | A1* | 7/2008 | Madnani | H04L 67/02 709/206 |
| 2009/0177754 | A1* | 7/2009 | Brezina | H04L 67/306 709/206 |
| 2010/0005138 | A1 | 1/2010 | Manzano | |
| 2011/0010258 | A1* | 1/2011 | Chavez | G06Q 30/0641 705/26.1 |
| 2011/0276897 | A1* | 11/2011 | Crevier | H04L 61/4555 715/752 |
| 2012/0151380 | A1* | 6/2012 | Bishop | G06F 16/168 715/752 |
| 2012/0246226 | A1* | 9/2012 | Anandam | H04L 67/06 709/203 |
| 2012/0278404 | A1 | 11/2012 | Meisels et al. | |
| 2013/0046833 | A1 | 2/2013 | Riepling et al. | |
| 2013/0080919 | A1* | 3/2013 | Kiang | H04L 67/63 715/753 |
| 2013/0117376 | A1* | 5/2013 | Filman | G06Q 10/10 709/205 |

OTHER PUBLICATIONS

Papers from IPR2024-00287, Jul. 1, 2025.
List of References Considered in Parent U.S. Appl. No. 17/938,037, which issued as U.S. Pat. No. 12,028,299B2 on Jul. 2, 2024.

* cited by examiner

800a

MIME-Version: 1.0
Content-Type: multipart/mixed; boundary="--OoOT----toOo--------"

--OoOT----toOo--------
Content-Type: text/plain
Hi, this is the first message        812a
--OoOT----toOo--------
Content-Type: application/id-request      804a
Accept: image/*        806a
<id-request>
  <and>        810a
    <criterion attribute="query" type="keyword" match-expression=""Uncle Joe"" />      802a
808a    <criterion attribute="scope" resource-type="content" />
  </and>
</id-request>
--OoOT----toOo--------

814a points to the --OoOT----toOo-------- boundary above 812a.

MIME-Version: 1.0
Content-Type: multipart/mixed; boundary="--toOo----OoOt--------"

--toOo----OoOt---------
Content-Type: text/plain
Dad,

See attached.        802b

Love,
William
--toOo----OoOt---------
Content-Type: application/query-respponse      806b FILE://Documents/Family/FamilyHistory.docx
FILE://Documents/Letters/XmasLetter-2012.pdf        804b
--toOo----OoOt---------

FIG. 8B

METHODS, SYSTEMS, AND COMPUTER PROGRAM PRODUCTS FOR PROCESSING A DATA OBJECT IDENTIFICATION REQUEST IN A COMMUNICATION

RELATED APPLICATIONS

The present application is a continuation of and claims priority to U.S. patent application Ser. No. 18/663,016 filed May 13, 2024 and entitled "METHODS, SYSTEMS, AND COMPUTER PROGRAM PRODUCTS FOR PROCESSING A DATA OBJECT IDENTIFICATION REQUEST IN A COMMUNICATION," which in turn is a continuation of and claims priority to U.S. patent application Ser. No. 17/938,037 filed Oct. 4, 2022 and entitled "METHODS, SYSTEMS, AND COMPUTER PROGRAM PRODUCTS FOR PROCESSING A DATA OBJECT IDENTIFICATION REQUEST IN A COMMUNICATION," which in turn is a continuation of and claims priority to U.S. patent application Ser. No. 17/187,621 filed Feb. 26, 2021 and entitled "METHODS, SYSTEMS, AND COMPUTER PROGRAM PRODUCTS FOR PROCESSING A DATA OBJECT IDENTIFICATION REQUEST IN A COMMUNICATION," which in turn is a continuation of and claims priority to U.S. patent application Ser. No. 16/803,980 filed Feb. 27, 2020 and entitled "METHODS, SYSTEMS, AND COMPUTER PROGRAM PRODUCTS FOR PROCESSING A DATA OBJECT IDENTIFICATION REQUEST IN A COMMUNICATION," which in turn is a continuation of and claims priority to U.S. patent application Ser. No. 15/984,406 filed May 20, 2018 and entitled "METHODS, SYSTEMS, AND COMPUTER PROGRAM PRODUCTS FOR PROCESSING A DATA OBJECT IDENTIFICATION REQUEST IN A COMMUNICATION," which is a continuation of and claims priority to U.S. patent application Ser. No. 15/724,223 filed Oct. 3, 2017 and entitled "METHODS, SYSTEMS, AND COMPUTER PROGRAM PRODUCTS FOR PROCESSING A DATA OBJECT IDENTIFICATION REQUEST IN A COMMUNICATION" which is a continuation-in-part of and claims priority to U.S. patent application Ser. No. 14/274,623 (published US 2014-0365588 A1) filed May 9, 2014 and entitled "METHODS, SYSTEMS, AND PROGRAM PRODUCTS FOR PROCESSING A DATA OBJECT IDENTIFICATION REQUEST IN A COMMUNICATION," which, in turn, is a continuation-in-part of and claims priority to U.S. patent application Ser. No. 13/624,906 (published US 2014-0089419 A1) filed Sep. 22, 2012 and entitled "METHODS, SYSTEMS, AND PROGRAM PRODUCTS FOR PROCESSING A DATA OBJECT IDENTIFICATION REQUEST IN A COMMUNICATION" and U.S. patent application Ser. No. 13/626,635 (published under US 2014-0089421 A1) filed Sep. 25, 2012 and entitled "METHODS, SYSTEMS, AND PROGRAM PRODUCTS FOR SHARING A DATA OBJECT IN A DATA STORE VIA A COMMUNICATION."

This application is related to the following U.S. Patent Applications:

U.S. patent application Ser. No. 12/833,016 (published US 2012-0011444 A1) filed on 2010 Jul. 9, entitled "METHODS, SYSTEMS, AND PROGRAM PRODUCTS FOR REFERENCING AN ATTACHMENT IN A COMMUNICATION";

U.S. patent application Ser. No. 12/833,014 (published US 2012-0011207 A1) filed on 2010 Jul. 9, entitled "METHODS, SYSTEMS, AND PROGRAM PRODUCTS FOR PROCESSING A REQUEST FOR A RESOURCE IN A COMMUNICATION";

U.S. patent application Ser. No. 13/624,906 (published US 2014-0089419 A1) filed 2012 Sep. 22 and entitled "METHODS, SYSTEMS, AND PROGRAM PRODUCTS FOR PROCESSING A DATA OBJECT IDENTIFICATION REQUEST IN A COMMUNICATION;" AND U.S. patent application Ser. No. 13/626,635 (published under US 2014-0089421 A1) filed 2012 Sep. 25 entitled "METHODS, SYSTEMS, AND PROGRAM PRODUCTS FOR SHARING A DATA OBJECT IN A DATA STORE VIA A COMMUNICATION;" the entire contents of each are herein incorporated by reference for all purposes.

BACKGROUND

While receiving attachments in a network communication, such as email, is common, most attachments received are unsolicited or unrequested. To request an attachment, a user typically sends the request as voice and/or text data in a voice and/or text message heard and/or read by another user. The request may be as vague or as specific as the language used by the requesting user. The other user must interpret the request and find a file or other data object that seems to match the request. The other user in many cases locates a "matching" resource using a program or application other than the communications agent that received the request. For example, a search program may be used to search a hard-drive by the other user. The other user must enter the search criteria.

Accordingly, there exists a need for methods, systems, and computer program products for processing a data object identification request in a communication.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for processing a data object identification request in a communication. In one aspect, the method includes receiving, by a first communications agent in a first execution environment from a first user represented by the first communications agent, data object information identifying a data object matching criterion. The method further includes sending, according to a first communications protocol via a network in a communication to a second communications agent in a second execution environment representing a second user, a first message including a data object identification request based on the data object matching criterion, wherein the first message is addressed to the second user. The method still further includes receiving, by the first communications agent in response to sending the data object identification request in the first message, a second message that includes a data object identification response that identifies a data object in a second data store in the second execution environment, wherein the second message is addressed to the first user and the data object is not received in the second message.

Also, a system for processing a data object identification request in a communication is described that includes one or more processors and logic encoded in one or more tangible media for execution by the one or more processors that when executed is operable for receiving, by a first communications agent in a first execution environment from a first user represented by the first communications agent, data object information identifying a data object matching criterion; sending, according to a first communications protocol via a network in a communication to a second communications agent in a second execution environment representing a second user, a first message including a data object identification request based on the data object matching criterion, wherein the first message is addressed to the second user; and receiving, by the first communications agent in response to sending the data object identification request in the first message, a second message that includes a data object identification response that identifies a data object in a second data store in the second execution environment, wherein the second message is addressed to the first user and the data object is not received in the second message.

Further, a system for processing a data object identification request in a communication is described. The system includes a query handler component for receiving, by a first communications agent in a first execution environment from a first user represented by the first communications agent, data object information identifying a data object matching criterion. The system further includes an identification request constructor component for sending, according to a first communications protocol via a network in a communication to a second communications agent in a second execution environment representing a second user, a first message including a data object identification request based on the data object matching criterion, wherein the first message is addressed to the second user. The system still further includes a result handler component for receiving, by the first communications agent in response to sending the data object identification request in the first message, a second message that includes a data object identification response that identifies a data object in a second data store in the second execution environment, wherein the second message is addressed to the first user and the data object is not received in the second message. The system also includes a processor, wherein at least one of the query handler component, the identification request constructor component, and the result handler component includes an instruction that is executed by the processor during operation of the system.

Methods and systems are described for processing a data object identification request in a communication. In one aspect, the method includes receiving, via a network by a second communications agent representing a second user and operating in a second execution environment, a first message from a first communications agent representing a first user and operating in a first execution environment. The method further includes detecting, by the second communications agent, a data object identification request included in the first message. The method still further includes generating, in response to detecting the data object identification request, a data object identification response that identifies a data object in a second data store in the second execution environment, wherein the data object is identified by processing the data object identification request. The method additionally includes sending a second message, via the network by the second communications agent to the first communications agent, that includes the data object identification response, wherein the second message does not include the data object. Performing at least one the preceding actions comprising the method includes execution of an instruction by a processor.

Also, a system for processing a data object identification request in a communication is described that includes one or more processors and logic encoded in one or more tangible media for execution by the one or more processors that when executed is operable for receiving, via a network by a second communications agent representing a second user and operating in a second execution environment, a first message from a first communications agent representing a first user and operating in a first execution environment; detecting, by the second communications agent, a data object identification request included in the first message; generating, in response to detecting the data object identification request, a data object identification response that identifies a data object in a second data store in the second execution environment, wherein the data object is identified by processing the data object identification request; and sending a second message, via the network by the second communications agent to the first communications agent, that includes the data object identification response, wherein the second message does not include the data object.

Further, a system for processing a data object identification request in a communication is described. The system includes a content manager component for receiving, via a network by a second communications agent representing a second user and operating in a second execution environment, a first message from a first communications agent representing a first user and operating in a first execution environment. The system further includes a query handler component for detecting, by the second communications agent, a data object identification request included in the first message. The system still further includes a query director component for generating, in response to detecting the data object identification request, a data object identification response that identifies a data object in a second data store in the second execution environment, wherein the data object is identified by processing the data object identification request. The system additionally includes an identification response builder component for, sending a second message, via the network by the second communications agent to the first communications agent, that includes the data object identification response, wherein the second message does not include the data object. The system also includes a processor, wherein at least one of the content manager component, the query handler component, the query director component, and the identification response builder component includes an instruction that is executed by the processor during operation of the system.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which:

FIG. 8A illustrates an exemplary portion of a communication between a first execution environment and a second execution environment according to an aspect of the subject matter described herein; and FIG. 8B illustrates another exemplary portion of a communication between a first execution environment and a second execution environment according to an aspect of the subject matter described herein.

DETAILED DESCRIPTION

Figure 1:
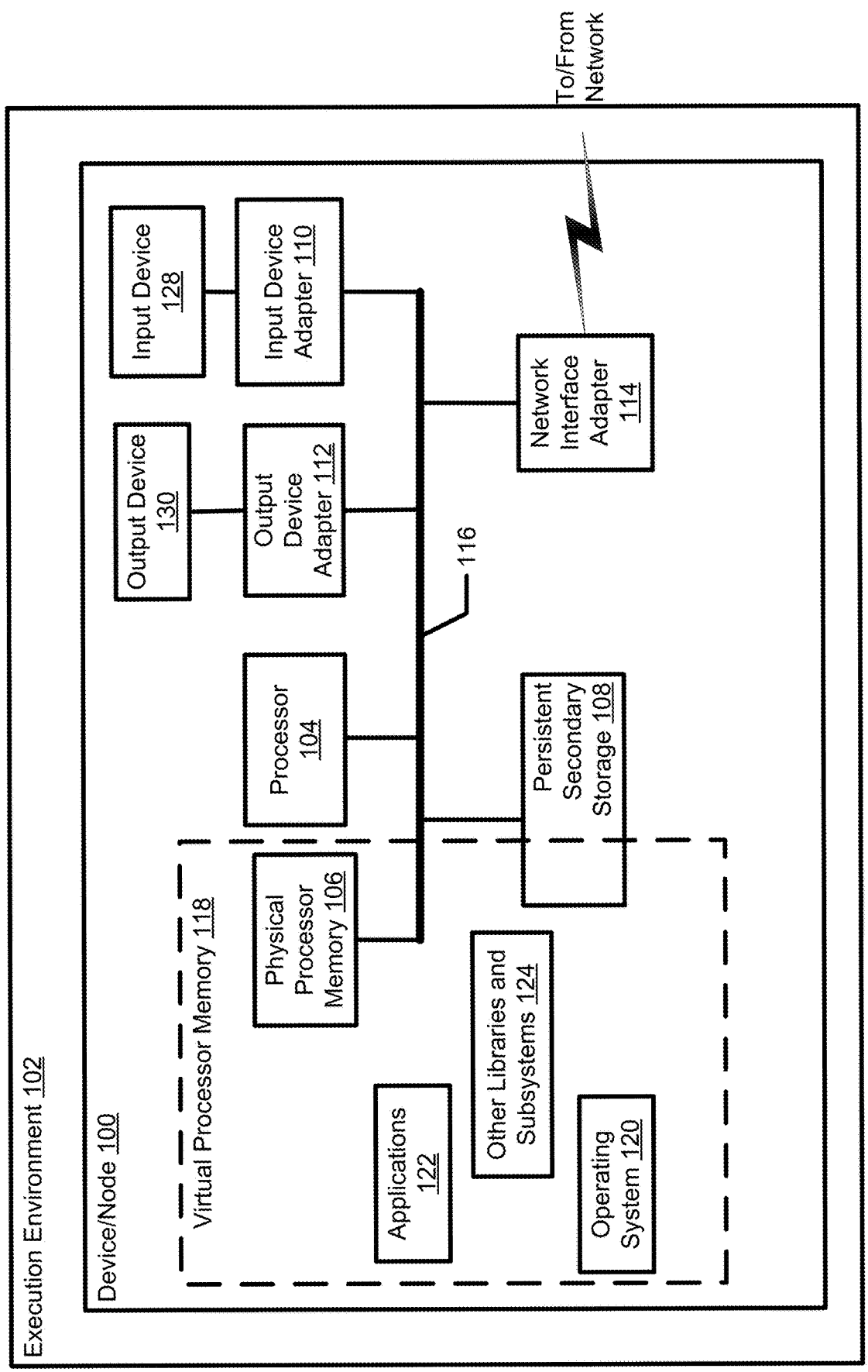
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety. In case of conflict, the present specification, including definitions, will control. In addition, the materials, methods, and examples are illustrative only and not intended to be limiting.

An exemplary device included in an execution environment that may be configured according to the subject matter is illustrated in FIG. 1. An "execution environment", as used herein, is an arrangement of hardware and, in some aspects, software that may be further configured to include and/or otherwise host an arrangement of components for performing a method of the subject matter described herein. An execution environment includes and/or is otherwise provided by one or more devices. The execution environment is said to be the execution environment of the device and/or devices. An execution environment may be and/or may include a virtual execution environment including software components operating in a host execution environment. Exemplary devices included in and/or otherwise providing suitable execution environments for configuring according to the subject matter include personal computers, notebook computers, tablet computers, servers, portable electronic devices, handheld electronic devices, mobile devices, multiprocessor devices, distributed systems, consumer electronic devices, routers, communication servers, and/or any other suitable devices. Those skilled in the art will understand that the components illustrated in FIG. 1 are exemplary and may vary by particular execution environment.

FIG. 1 illustrates a hardware device 100 included in an execution environment 102. FIG. 1 illustrates that execution environment 102 includes a processor 104, such as one or more microprocessors; a physical processor memory 106 including storage locations identified by addresses in a physical memory address space of processor 104; a persistent secondary storage 108, such as one or more hard drives and/or flash storage media; an input device adapter 110, such as a key or keypad hardware, a keyboard adapter, and/or a mouse adapter; an output device adapter 112, such as a display and/or an audio adapter for presenting information to a user; a network interface component, illustrated by a network interface adapter 114, for communicating via a network such as a LAN and/or WAN; and a communication mechanism that operatively couples elements 104-114, illustrated as a bus 116. Elements 104-114 may be operatively coupled by various means. Bus 116 may comprise any type of bus architecture, including a memory bus, a peripheral bus, a local bus, and/or a switching fabric.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs). Processor 104 may access machine code instructions and data via one or more memory address spaces in addition to the physical memory address space. A memory address space includes addresses identifying locations in a processor memory. The addresses in a memory address space are included in defining a processor memory. Processor 104 may have more than one processor memory.

Thus, processor 104 may have more than one memory address space. Processor 104 may access a location in a processor memory by processing an address identifying the location. The processed address may be identified by an operand of a machine code instruction and/or may be identified by a register or other portion of processor 104.

FIG. 1 illustrates a virtual processor memory 118 spanning at least part of physical processor memory 106 and may span at least part of persistent secondary storage 108. Virtual memory addresses in a memory address space may be mapped to physical memory addresses identifying locations in physical processor memory 106. An address space for identifying locations in a virtual processor memory is referred to as a virtual memory address space; its addresses are referred to as virtual memory addresses; and its processor memory is referred to as a virtual processor memory or virtual memory. The term "processor memory" may refer to physical processor memory, such as processor memory 106, and/or may refer to virtual processor memory, such as virtual processor memory 118, depending on the context in which the term is used.

Physical processor memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), RAMBUS DRAM (RDRAM), and/or XDRTM DRAM. Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include a removable data storage medium. The drives and their associated tangible computer readable storage media provide volatile and/or nonvolatile storage for computer-readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including an operating system 120, one or more applications 122, and other program code and/or data components illustrated by other libraries and subsystems 124. In an aspect, some or all software components may be stored in locations accessible to processor 104 in a shared memory address space shared by the software components. The software components accessed via the shared memory address space are stored in a shared processor memory defined by the shared memory address space. In another aspect, a first software component may be stored in one or more locations accessed by processor 104 in a first address space and a second software component may be stored in one or more locations accessed by processor 104 in a second address space. The first software component is stored in a first processor memory defined by the first address space and the second software component is stored in a second processor memory defined by the second address space.

Software components typically include instructions executed by processor 104 in a computing context referred to as a "process". A process may include one or more "threads". A "thread" includes a sequence of instructions executed by processor 104 in a computing sub-context of a process. The terms "thread" and "process" may be used interchangeably herein when a process includes only one thread.

Execution environment 102 may receive user-provided information via one or more input devices illustrated by an input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by processor 104, physical processor memory 106, and/or other components included in execution environment 102.

An output device 130 in FIG. 1 exemplifies one or more output devices that may be included in and/or that may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. The terms "communication interface component" and "network interface component" are used interchangeably herein. FIG. 1 illustrates network interface adapter (NIA) 114 as a network interface component included in execution environment 102 to operatively couple device 100 to a network. A network interface component includes a network interface hardware (NIH) component and optionally a network interface software (NIS) component.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LAN, WANs, and/or personal area networks (PANs). Exemplary networks also include intranets and internets such as the Internet.

The terms "network node" and "node" in this document both refer to a device having a network interface component for operatively coupling the device to a network. Further, the terms "device" and "node" used herein may refer to one or more devices and nodes, respectively, providing and/or otherwise included in an execution environment unless clearly indicated otherwise.

The user-detectable outputs of a user interface are generically referred to herein as "user interface elements" or abbreviated as "UI elements". More specifically, visual outputs of a user interface are referred to herein as "visual interface elements". A visual interface element may be a visual output of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual output", and "visual interface element" are used interchangeably in this document. Other types of UI elements include audio outputs referred to as "audio interface elements", tactile outputs referred to as "tactile interface elements", and the like.

A visual output may be presented in a two-dimensional presentation where a location may be defined in a two-dimensional space having a vertical dimension and a horizontal dimension. A location in a horizontal dimension may be referenced according to an X-axis and a location in a vertical dimension may be referenced according to a Y-axis. In another aspect, a visual output may be presented in a three-dimensional presentation where a location may be defined in a three-dimensional space having a depth dimension in addition to a vertical dimension and a horizontal dimension. A location in a depth dimension may be identified according to a Z-axis. A visual output in a two-dimensional presentation may be presented as if a depth dimension existed allowing the visual output to overlie and/or underlie some or all of another visual output.

An order of visual outputs in a depth dimension is herein referred to as a "Z-order". The term "Z-value" as used herein refers to a location in a Z-order. A Z-order specifies the front-to-back and/or back-to-front ordering of visual outputs in a presentation space with respect to a Z-axis. In one aspect, a visual output with a higher Z-value than another visual output may be defined to be on top of or closer to the front than the other visual output. In another aspect, a visual output with a lower Z-value than another visual output may be defined to be on top of or closer to the front than the other visual output.

A "user interface (UI) element handler" component, as the term is used herein, includes a component of configured to send information representing a program entity for presenting a user-detectable representation of the program entity by an output device, such as a display. A "program entity" is an object included in and/or otherwise processed by an application or executable. The user-detectable representation is presented based on the sent information. Information that represents a program entity for presenting a user detectable representation of the program entity by an output device is referred to herein as "presentation information". Presentation information may include and/or may otherwise identify data in one or more formats. Exemplary formats include image formats such as raw pixel data, JPEG, video formats such as MP4, markup language data such as hypertext markup language (HTML) and other XML-based markup, a bit map, and/or instructions such as those defined by various script languages, byte code, and/or machine code. For example, a web page received by a user agent from a remote application provider may include HTML, ECMAScript, and/or byte code for presenting one or more UI elements included in a user interface of the remote application. Components configured to send information representing one or more program entities for presenting particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space as sensory information for a user. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, is a presentation space.

As used herein, the terms "program" and "executable" refer to any data representation that may be translated into a set of machine code instructions and may optionally include associated program data. The terms are used interchangeably herein. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code. As used herein, the terms "application", and "service" may be realized in one or more executables and/or in one or more hardware components. The terms are used interchangeably herein.

As used herein, an "addressable entity" is program or a portion thereof, specifiable in programming language in source code. An addressable entity is addressable in a program component translated for a compatible execution environment from the source code. Examples of addressable entities include variables, constants, functions, subroutines, procedures, modules, methods, classes, objects, code blocks, and labeled instructions. A code block includes one or more instructions in a given scope specified in a programming language. An addressable entity may include a value. In some places in this document "addressable entity" refers to a value of an addressable entity. In these cases, the context will clearly indicate that the value is being referenced.

Addressable entities may be written in and/or translated to a number of different programming languages and/or representation languages, respectively. An addressable entity may be specified in and/or translated into source code, object code, machine code, byte code, and/or any intermediate languages for processing by an interpreter, compiler, linker, loader, and/or other analogous tool.

As used herein, the term "network protocol" refers to a formal set of rules, conventions and data structures that governs how computers and other network devices exchange information over a network. The rules, conventions, and data structures are said to be specified or defined in a specification and/or schema.

The term "network path" as used herein refers to a sequence of nodes in a network that are communicatively coupled for transmitting data in one or more data units of a specified network protocol between a pair of nodes in the network.

A "data unit", as the term is used herein, is a data entity specified according to a network protocol for transmitting data contained in and/or otherwise identified by the data entity. A data unit is transmitted between a pair of nodes in a network path to send the data in and/or otherwise identified by the data unit from a source node to a destination node that includes a protocol endpoint of the network protocol. A network protocol explicitly and/or implicitly specifies and/or otherwise identifies a schema that defines one or more of a format for a valid data unit and a vocabulary for content of a valid data unit. One example of a data unit is an Internet Protocol (IP) packet. The Internet Protocol defines a format for an IP packet that defines a header for identifying a destination address that identifies a destination node and a payload portion for including a representation of data to be delivered to the identified destination node. The terms "data unit", "data packet", and "packet" are used interchangeably herein. One or more data units of a first network protocol may transmit a message of second network protocol. For example, one or more data units of the IP protocol may include a TCP message. In another example, one or more TCP data units may transmit an HTTP message.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units for transmitting to a next node in the network path. Portions of data received in several data units may be combined into a single data unit for transmitting by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint that may be represented in a data unit of the protocol. For example 192.168.1.1 is an IP protocol address represented in a human readable format that may be included in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

Since a protocol endpoint is included in a node and is accessible via a network via a network interface, a protocol address identifies a node and identifies a network interface of the node. A network interface may include one or more NICs operatively coupled to a network.

A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

The term "hop" as used herein refers to a pair of consecutive nodes in a network path for transmitting, via a network protocol, data sent from a source node to a destination node. A "hop path" is thus a sequence of hops in a network that respectively include a sequence of pairs of consecutive nodes included in transmitting data from a first path end node of the network path to a second path end node of the network path.

The term "path-based protocol address" as used herein refers to a protocol address for a network protocol that includes a plurality of path segment identifiers that identify portions of a specific network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of network interface identifiers that identify a sequence of network interfaces in a network path. A "NIC-based protocol address" is a type of network-interface-based protocol address that includes a plurality of identifiers that identify a sequence of network interface components. A "hop-based protocol address" is a type path-based protocol address since a hop is a type of network path.

Given the above definitions, note that the terms "network path" and "hop" may be defined in terms of network interfaces. A "network path" and a "hop path" include a sequence of network interfaces in a network that are included in transmitting data between a pair of path end nodes in the network. A "hop" refers to at least part of a network path that includes a pair of consecutive network interfaces in a sequence of network interfaces in a network path. A "network path" is thus a sequence of hops in a network that respectively include a sequence of pairs of consecutive network interfaces included in transmitting data from a first path end node of the network path to a second path end node of the network path.

The term "network topology" as used herein refers to a representation of protocol endpoints and/or nodes in a network, and representations of hops representing communicative couplings between and/or among the protocol endpoints and/or nodes in the network. A network may have different network topologies with respect to different network protocols. A network topology may represent physical communicative couplings between nodes in the network. A network topology may represent logical couplings between protocol endpoints and/or nodes of a particular network protocol or a particular type of network protocol.

The domain name system (DNS) of the Internet operates based on an application layer protocol defined by the DNS. The nodes in the DNS are communicatively coupled via the DNS protocol and may be represented by a logical network topology. A DNS system includes nodes connected via the DNS protocol and thus has a network topology defined by nodes that include protocol endpoints of the DNS protocol. In still another example, a token-ring network has a circular topology at the link layer, but may have a star topology at the physical layer.

As used herein, an "entity-specific address space" refers to an address space defined for a specific entity where the addresses in the address space operate as identifiers in the context of the entity. An address from an entity-specific address space is referred to herein as an "entity-specific address". An address is "entity-specific" in that what it identifies is based on the entity to which it is specific. Another address having the same form and content may identify a different entity when in an address space specific to another entity. Addresses in an entity-specific address space operate as identifiers in the context of an entity to which they are "specific" as defined by the specific association of the address space and the entity. Without knowledge of the entity to which an entity-specific address space is specific, what an address in the entity-specific address space identifies is indeterminate. The terms "entity-specific address" and "entity-specific identifier" are used interchangeably herein. An entity-specific address may identify an entity included in the entity to which the address is specific or may identify an entity external to the entity to which the address is specific. The fact that an address is entity-specific does not define a scope for the address.

A portion of a network is a type of entity. A type of entity-specific address space described herein is a scope-specific address space. As used herein, a "scope-specific address space", specific to a particular region of a network, is an address space defined for the particular network region, where an address in the scope-specific protocol address operates as identifier, according to a network protocol, of a protocol endpoint in a node outside of the particular region when processed in the context of a node in the particular region. The region is indicated by the span of an indicated scope. The terms "region" and "zone" are used interchangeably herein. An address from a scope-specific address space is referred to herein as a "scope-specific protocol address". An address is "scope-specific" in that what protocol endpoint it identifies depends on the region to which it is specific. Another address having the exact same form and content may identify a different protocol endpoint when in an address space that is specific to another region. A protocol address in a scope-specific address space serves as an identifier in the context of a node in a region to which the scope-specific address space is "specific" as defined by an association of the address space and the region indicated by the scope. Without knowledge of the particular region to which a scope-specific address space is specific, what a scope-specific protocol address in the scope-specific address space identifies is indeterminate. The terms "scope-specific protocol address" and "scope-specific protocol identifier" are used interchangeably herein. Types of scope-specific address spaces indicating exemplary spans include site-specific, LAN-specific, subnet-specific, city-specific, business-specific, and node-specific.

For a network protocol, an address in a scope-specific address space serves as an identifier of a protocol endpoint in a node. Data may be received via the protocol endpoint from a network via one or more network interfaces that operatively couple the node to the network. Data may be sent via the protocol endpoint for transmitting over the network via the one or more network interfaces in the node. Since a protocol endpoint of a network protocol is included in a node and is accessible via a network via a network interface, a protocol address identifying the protocol endpoint also identifies the node and identifies a network interface of the node.

As used herein, a "node-specific address space" is a scope-specific address space defined for a specific node in a network, where the addresses in the node-specific address space operate as identifiers of nodes and/or network interfaces in the network when processed in the context of the specific node. An address from a node-specific address space is referred to herein as a "node-specific address". An address is "node-specific" in that what it identifies depends on the node to which is defined as specific. Another address having the exact same form and content may identify a different node when in an address space specific to another node. Addresses in a node-specific address space operate as identifiers in the context of a node to which they are "specific" as defined by the specific association of the address space and the node. Without knowledge of the node to which a node-specific address space is specific, addresses in the node-specific address space are indeterminate. The terms "node-specific address" and "node-specific identifier" are used interchangeably herein. A node-specific address space is a type of scope-specific address space.

The term "node" is defined above. Note that an identifier of a network interface in a network also identifies a node that includes the network interface. Thus, a network interface-specific address is also a node-specific address. Network interfaces in a node may have their own respective network interface-specific address spaces that are also node-specific. The network interface-specific address spaces may be combined to form a node-specific address space and/or may be managed as separate address spaces. The adjectives "node-specific" and "network interface-specific" may be used interchangeably.

A scope-specific identifier differs from a scoped address as described in "Request for Comments" (RFC) document RFC 4007 by S. Deering, et al, titled "IPv6 Scoped Address Architecture", published by the IETF in December 2006 and further described in application Ser. No. 11/962,285, by the present inventor, filed on 2007 Dec. 21, entitled "Methods and Systems for Sending Information to a Zone Included in an Internet Network". A scoped address space is shared by nodes in a given scope. While a link-local scoped address is specific to a particular node, a link-local scoped address simply identifies a network interface component local to the particular node. A loop-back internet address is specific to a node as well. Neither link-local scoped addresses nor loop-back addresses identify one node to another. As such, neither serves as a node-specific identifier as defined above.

A "scoped address" is described by RFC 3513 and RFC 4007 as an identifier that, in a particular region of a network, serves as a protocol address of a network interface and/or a node in the particular region. The extent of the particular region is referred to as the scope of the region and thus the scope within which the identifier serves as a protocol address. A particular region included within a scope as indicated by its span. A scoped address is a valid protocol address only within a particular region as indicated by the address's indicated scope. Examples of scope indicators include node-scope where identifiers are valid only to a single node in the indicated span, LAN-scope where identifiers are valid for nodes in the span of a particular LAN, and subnet-scope where identifiers are valid only for nodes in a particular subnet. RFC 3513 currently defines support for link-local scope, site-local scope, a global scope. A data unit transmitted with a scoped address should not be delivered to node that does not have a network interface in the span indicated by the scope.

"Path information" is any information that identifies a network path and/or hop path for data transmitted via one or more specified network protocols. Path information may be identified by identifying network interfaces, NICs, nodes, and/or hops included in a network path. "Address information" is any information that identifies a protocol address that, for a network protocol, identifies a protocol endpoint. Address information may identify a unicast protocol address for a network protocol. In identifying a protocol endpoint, a protocol address identifies a node and a network interface. Those skilled in the art will understand upon reading the descriptions herein that the subject matter disclosed herein is not restricted to the network protocols described and/or their corresponding OSI layers. For ease of illustration, the subject matter is described in terms of protocols that correspond to OSI layer three, also referred to as network layer protocols, in general. Particular descriptions are based on versions of the Internet Protocol (IP). Address information may identify one or more protocol addresses. Exemplary protocol addresses include IP addresses, IPX addresses, DECNet addresses, VINES Internet Protocol addresses, and Datagram Delivery Protocol (DDP) addresses.

The term "path-based address" is defined above. A "node-based address" is a path-based address where some or all of the address includes node identifiers that identify a sequence of nodes in a network path. A "network-interface-based address" is a path-based address where some or all of the address identifies includes identifiers of a network interfaces in sequence in a network path. A "NIC-based address" is a type of network-interface-based address that identifies a sequence of network interface components. A "hop-based address" is a path-based address where some or all of the address identifies one or more hops in a network path. The protocol address types defined are not mutually exclusive.

The term "metric space", as used herein, refers to a set, as defined in mathematics, where a distance between elements of the set is defined according to a metric. Metric spaces defined in Euclidean geometry are well-known examples. Those skilled in the art of metric spaces, such as Euclidian spaces, will appreciate that a one-to-one mapping may be determined and/or otherwise identified for mapping addresses from a first coordinate space having a first origin for a metric space to addresses from a second coordinate space having a second origin in the metric space. Given a mapping rule between a first scope-specific address space and a second scope-specific address space and a mapping between the second scope-specific address space and a third scope-specific address space based on a third coordinate space identifying a third origin in the metric space, a mapping from the first coordinate space to the third coordinate space may be determined. A mapping between coordinate spaces for a metric space may be included a coordinate shift and/or a rotation, for example. The mapping may be pre-specified and accessible to the nodes in one or both address spaces. Mapping between locations in a number of different metric spaces is well-known in mathematics. For example, a top half of the surface of sphere may be mapped to a plane. Some will further appreciate that some metric spaces may be mapped to other metric spaces. Some of these mappings are one-to-one and onto.

An "interaction", as the term is used herein, refers to any activity including a user and an object where the object is a source of sensory data detected by the user. In an interaction the user directs attention to the object. An interaction may also include the object as a target of input from the user. The input from the user may be provided intentionally or unintentionally by the user. For example, a rock being held in the hand of a user is a target of input, both tactile and energy input, from the user. A portable electronic device is a type of object. In another example, a user looking at a portable electronic device is receiving sensory data from the portable electronic device whether the device is presenting an output via an output device or not. The user manipulating an input component of the portable electronic device exemplifies the device, as an input target, receiving input from the user. Note that the user in providing input is detecting sensory information from the portable electronic device provided that the user directs sufficient attention to be aware of the sensory information and provided that no disabilities prevent the user from processing the sensory information. An interaction may include an input from the user that is detected and/or otherwise sensed by the device. An interaction may include sensory information that is detected by a user included in the interaction that is presented by an output device included in the interaction.

As used herein "interaction information" refers to any information that identifies an interaction and/or otherwise provides data about an interaction between a user and an object, such as a portable electronic device. Exemplary interaction information may identify a user input for the object, a user-detectable output presented by an output device of the object, a user-detectable attribute of the object, an operation performed by the object in response to a user, an operation performed by the object to present and/or otherwise produce a user-detectable output, and/or a measure of interaction. The term "operational component" of a device, as used herein, refers to a component included in performing an operation by the device.

Interaction information for one object may include and/or otherwise identify interaction information for another object. For example, a motion detector may detect user's head turn in the direction of a display of a portable electronic device. Interaction information identifying the user's head is facing the display may be received and/or used as interaction information for the portable electronic device indicating the user is receiving visual input from the display. The interaction information may serve to indicate a lack of user interaction with one or more other objects in directions from the user different than the detected direction, such as a person approaching the user from behind the user. Thus the interaction information may serve as interaction information for one or more different objects.

The term "attention information" as used herein refers to information that identifies an attention output and/or that includes an indication to present an attention output. Attention information may identify and/or may include presentation information that includes a representation of an attention output, in one aspect. In another aspect, attention output may include a request and/or one or more instructions for processing by a processor to present an attention output. The aspects described serve merely as examples based on the definition of attention information, and do not provide an exhaustive list of suitable forms and content of attention information.

As used herein the term "attention criterion" refers to a criterion that when met is defined as indicating that interaction between a user and an object is or maybe inadequate at a particular time and/or during a particular time period. In other words, the user is not directing adequate attention to the object.

As used herein, the term "tag" refers to a character string, which may include one or more words, which may be associated with a resource to create an association between the resource and another resource also tagged with the tag. Tags are often used in sharing media, social bookmarking, social news and blog entries to help users search for associated content. In some contexts, the term "tagging" as used herein refers to the process of associating a tag with a resource that can be tagged. As used herein, the term "tagged association" refers to an association that identifies a tag and a resource that is tagged with the tag. A resource is said to be "tagged" with a tag when a tagging process, also referred to as "tagging", has successfully created a tagged association. In other contexts, a "tagging" refers to a tagged association.

The term "matched tag", as used herein, refers to an association that identifies a tag and a tagging criterion, where the tagging criterion is based on data other than the tag. The tagging criterion may be based additionally on the tag. The term "tagging association", as used herein, refers to a matched tag represented in a memory, either persistent and/or volatile. For example, a tagging association may be realized as a record that includes and/or identifies a tag and a tagging criterion. The terms "matched tag" and "tagging association" are used interchangeably. When the term "matched tag" refers to something other than its tagging association, it will be made clear. For example, a reference to matched tag presented in a user interface clearly identifies a UI element that identifies and/or otherwise represents and/or otherwise identifies a matched tag either realized or to be realized in a tagging association. A tagged association, defined above, may identify a matched tag and a resource that is tagged with the tag identified by the matched tag. Such an association is also referred to herein as a "matched tag association". A resource may be tagged with a matched tag when a tagging criterion identified by the matched tag is met for the resource.

As user herein, the term "vocabulary" refers to a set of valid values that can be assigned to and/or included in a data element. With respect to a tag, a vocabulary defines valid tags. A vocabulary may be specified by one or more rules and/or by identifying one or more valid values directly and/or indirectly.

As used herein, the term "dictionary" refers a vocabulary wherein one or more terms in the vocabulary is assigned a definition. A "definition" as the term is used herein refers to information that identifies semantic information about a data value, such as a t tag. Semantic information may include one or more of a textual description of a meaning of the term, an audio description, a visual description, and information identifying a use or context for the term. A use and/or context may be identified, for example, by identifying a part of speech, a dialect or language, an antonym, a synonym, and/or an example usage of the defined data value.

As used herein, any reference to an entity "in" an association is equivalent to describing the object as "identified" by the association, unless explicitly indicated otherwise.

As used herein, the term "communication" refers to information including a message sent and/or for sending via a network between communicants. A message may include text data, audio data, and/or image data. The term "communicant" as used herein refers to a user included in a communication as a sender and/or a receiver of the information. A communicant is represented by a "communications agent" configured to operate in an execution environment to send data to and/or receive data from another communications agent, on behalf of the represented communicant, according to a communications protocol via network. A communications protocol defines and/or otherwise identifies an address space including communications addresses for delivering data sent in a communication from one communications agent to another. A communications protocol is a type of network protocol.

The term "communicant alias" as used herein refers to an identifier of a communicant in a communication where the communicant alias is not a communications address included in an address space of a communications protocol for sending and/or receiving data in the communication.

The term "attachment" as used herein refers to a portion of a communication that includes data from one communicant to another other than data in the message portion. A resource sent as an attachment is data that is typically not presented "inline" or in a message included in a message portion of a communication. Email attachments are perhaps the most widely known attachments included in communications. An email attachment is a file or other resource sent along with an email in a portion of the email separate from a message portion. A communication may include one or more resources as one or more attachments.

The terms "contactor" and "contactee" identify roles in a communication. A "contactor" provides information for identifying a "contactee" in a communication. A contactee may be included in a communication by a contactor and/or the contactor's communications agent. A contactor and/or a contactee are roles of a user or communicant of a communications agent and may played by a living being, a node, a component, and/or an application. Both a contactor and a contactee are communicants in a communication.

As used here, the term "tagging-attribute association" refers to an association that identifies one or more tagging criterion and a resource attribute that the one or more tagging criterion are each based on. That is, whether a tagging criterion identified in a tagging-attribute association is met for a specified resource depends on an attribute of the resource identified by the tagging-attribute association. The term attribute, as used herein, includes the resource, as a resource is considered to be an attribute of itself and/or otherwise to include at least some of its attributes.

As used herein, the term "resource scope" refers a bounded space in which a resource may be identified. The space may be any space in which a resource may be locate and/or otherwise identified. A bounded may be may include one or more of an identifier space such as file system identifier space and/or a URI address space, a storage space, a geospatial space, a demographic space, and a data type—to name a few examples. space, defines a set of resources from which resources may be identified. For example, the files within a specified folder and its subfolders in a file system define and/or otherwise specify a resource scope. All user accounts that have an administrator security role define another resource scope. The present disclosure describes a resource scope with respect to resources tagged with a specified tag that makeup a set, referred to herein as a "tagged resource set". A tagged resource set may include a resource tagged with a tag identified by a matched tag.

In specifying a resource scope, one or more criterion may be specified. The terms "criterion" and "constraint" are used interchangeably herein, with respect to a resource scope. A criterion included in specifying a resource scope is referred to herein as a "scope criterion". A scope criterion may be expressed via any suitable manner, such as a file name, a wildcard expression, a regular expression, a data store location, a data base query, geospatial coordinates, a time, a date, a duration, a relationship to a user, and/or an address—too name a few examples. With respect to a tag, a scope criterion included in defining a resource scope differs from a tagging criterion for the tag in that the scope criterion included in defining a resource scope need not be met in order for a resource to be tagged with the tag. Further a resource scope may be used for purposes other than processing related to a tagged resource.

One or more scope criterion that together specify and/or otherwise define a resource scope is/are referred to herein as a "scope descriptor". When all the criteria in a scope descriptor are met for a resource, the resource is in the resource scope defined by the scope descriptor. The one or more separate criterion in a scope descriptor may be evaluated in any order suitable or desirable in any given embodiment. In an aspect described below, one scope criterion, that may be included in a scope descriptor, may be specified to determine and/or otherwise identify when the scope descriptor is "active". A scope criterion that indicates whether a scope descriptor is active is referred to herein as a "scope condition". In a further aspect a scope descriptor may include no other criterion indicating the resource scope includes all resources accessible to an application, subsystem, execution environment, and/or group of any of the preceding that are processing and/or otherwise making use of the scope descriptor. Those skilled in the art will understand that whether a scope criterion in a scope descriptor is called a scope condition or not depends on the role played by the scope criterion. The subject matter may be described without referring to a scope criterion in the role of a scope condition without limiting the scope of subject matter.

Although, those skilled in the art will know that a scope criterion may be defined as "met" when it is true or may be defined as "met" when it is not true; for purposes of the present disclosure, A scope criterion is said to be "met" for a resource when it indicates the resource is in the resource scope defined by the scope descriptor, and is to be "not met" otherwise. A scope criterion in the role of a scope condition in a scope descriptor is said to be "met" when it indicates the scope descriptor is active, as is said to be "not met" otherwise. In an aspect, a scope descriptor may not include a scope condition or may include a scope condition that is always met. Such a scope descriptor is active by definition. Whether a criterion, in a scope descriptor is met or is not met, may depend on an evaluation of the scope criterion that is based on an identifiable entity. For a scope condition, such an entity is referred to herein as a "condition entity". More generally, for a scope criterion, such an entity is referred to herein as a "scoping entity". Exemplary entities include a user, a document, a measure of time, a location, and the like.

An association between a tag and scope descriptor is referred to herein as a "scoped tag". A scoped tag is also referred to herein as a match set. As defined above, a tagging criterion may be used to determine whether to tag a particular resource with a particular tag. The tagging criterion is associated with the tag by a matched tag. A scope descriptor identifies resource scope that includes a set of resources. Scope descriptors are necessarily associated with resources.

A "tagging context", as the term is used herein, identifies and/or otherwise includes a set of tagged associations or taggings. The taggings may identify one or more tags and one or more resources. A "tagging context specification", as the term is used herein, is data that defines and/or otherwise specifies a tagging context. A tagging context specification may be stored in a memory location. The memory location may be contiguous or not and may be included in one or more data storage media, which may be volatile or not. A tagging context specification may include and/or otherwise identify any suitable criterion, referred to in general as "context criterion", for determining whether a tagging is in a tagging context defined by the tagging context specification. For example, a tag contact specification may identify one or more scope descriptors, one or more tags some or all of which may be and/or may be identified by matched tags, and a context condition; all of which are context criterion by definition.

A "context condition", as the term is used herein, refers to a context criterion that when met indicates that a tagging context is active for one or more taggings. When a context condition is not met, it is said to be inactive or not active for one or more taggings. For example, a context condition in a tagging context specification may be met for a first user. Taggings in the tagging context are "active" for the first user. For a second user, the context condition may not be met. The taggings are not active for the second user. A context condition, or more generally a context criterion, may be based on any suitable data for any suitable entity. A tagging context may be active for a task and not for another and/or a tagging context may be active for one location and not for another, to name a couple of other examples. When a context condition indicates that an associated tagging context is active for a tag, the context condition is herein said to be "met", otherwise the context condition is not met.

Figure 2A:
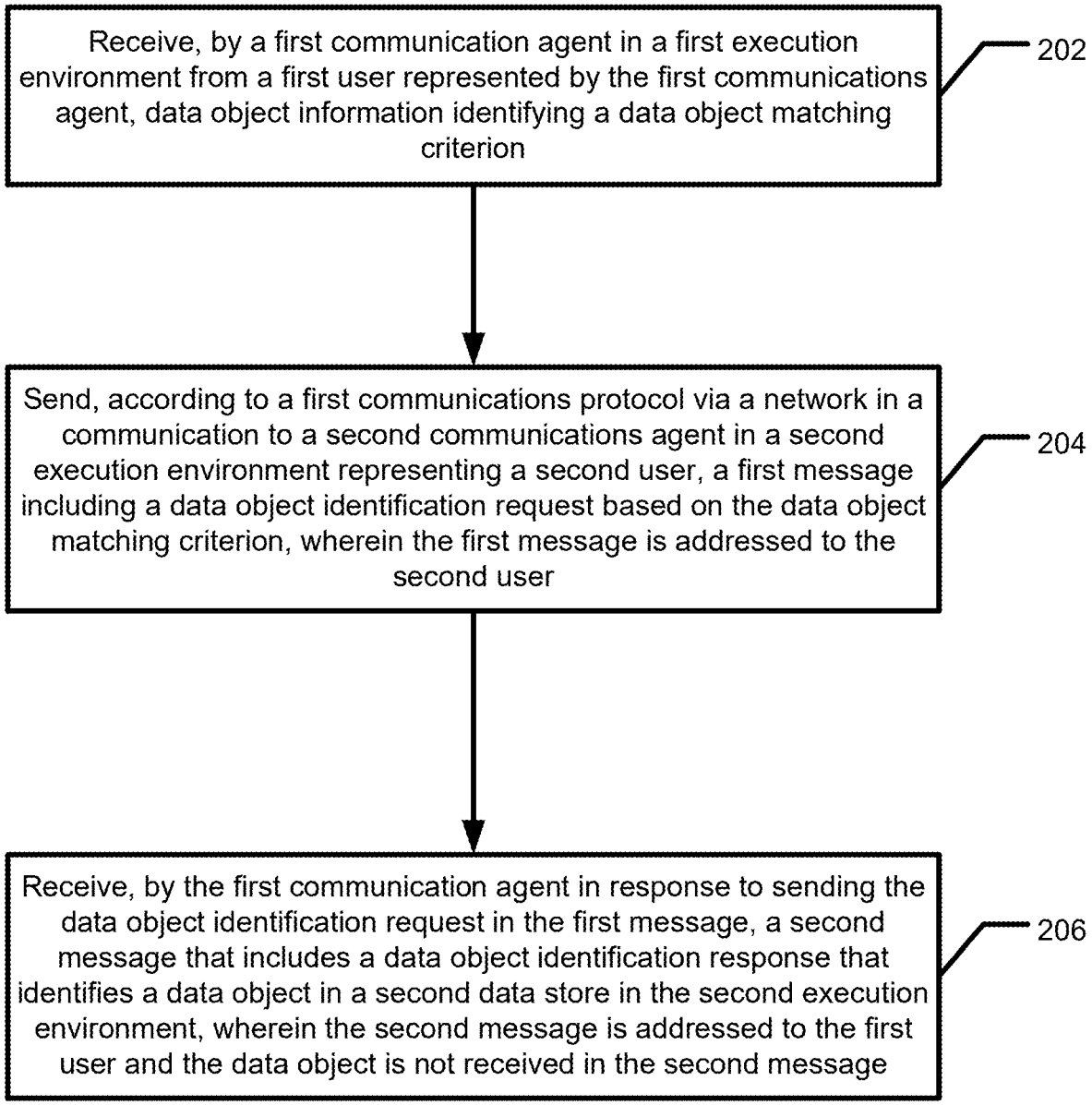
FIG. 2A is a flow diagram illustrating a method for processing a data object identification request in a communication according to an aspect of the subject matter described herein.
Figure 2B:
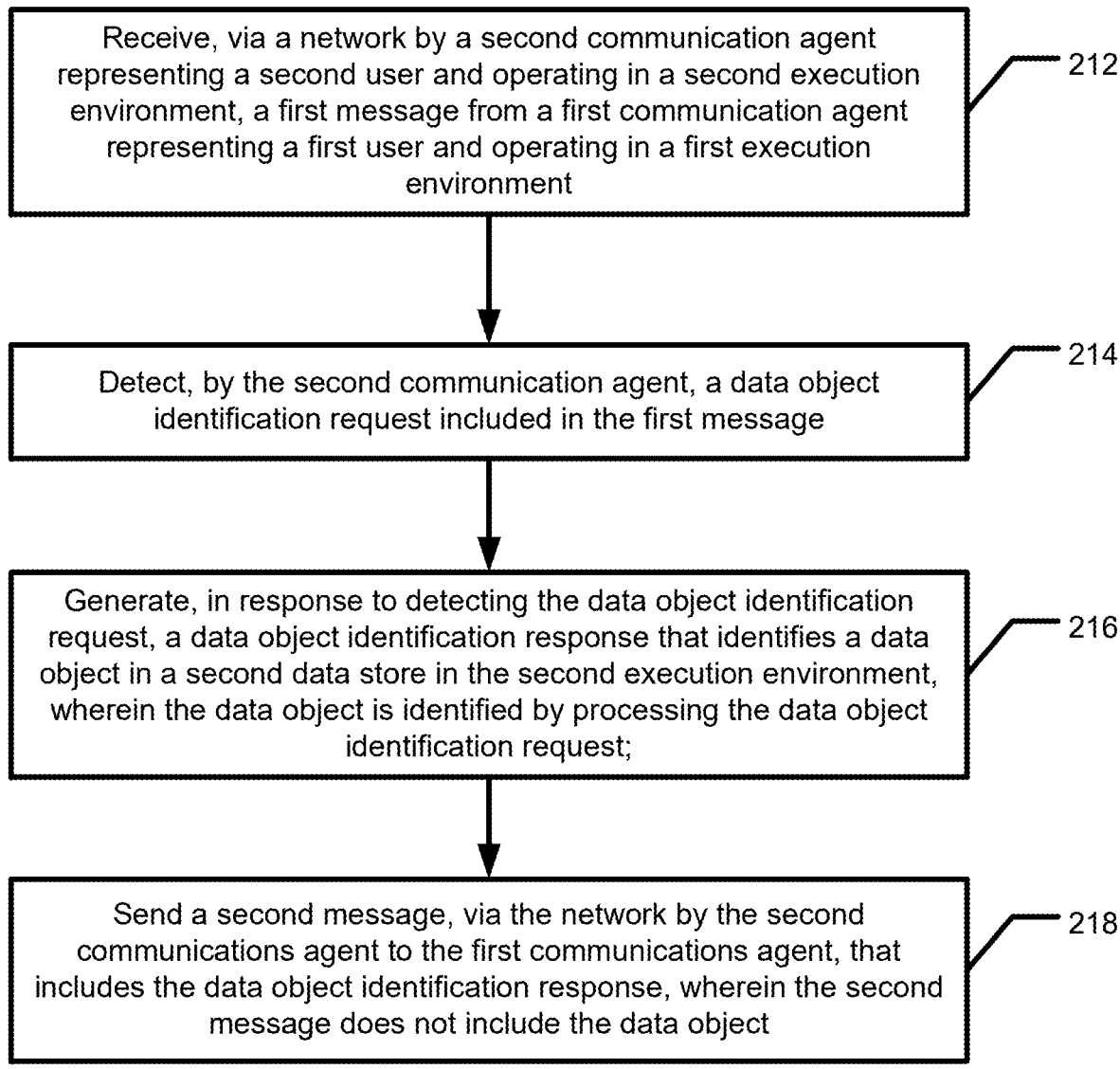
FIG. 2B is a flow diagram illustrating a method for processing a data object identification request in a communication according to an aspect of the subject matter described herein.
Figure 3A:
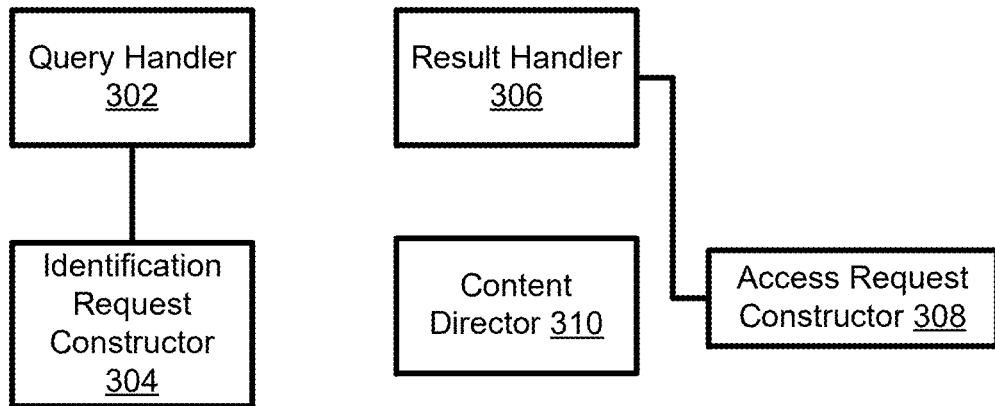
FIG. 3A is a block diagram illustrating an arrangement of components for processing a data object identification request in a communication according to another aspect of the subject matter described herein.
Figure 3B:
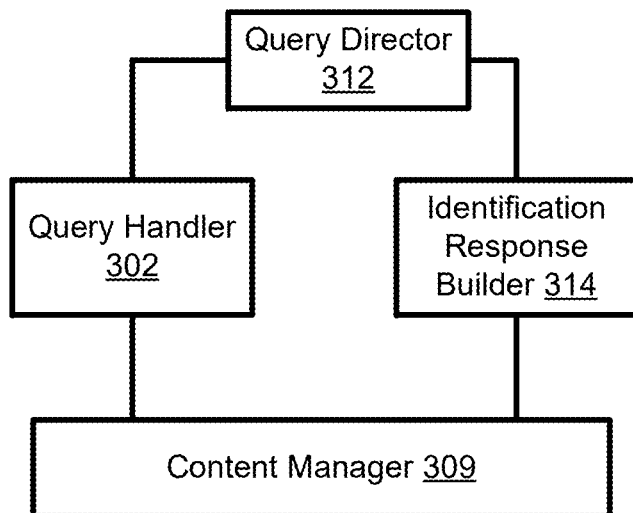
FIG. 3B is a block diagram illustrating an arrangement of components for processing a data object identification request in a communication according to another aspect of the subject matter described herein.

FIG. 3A illustrates an arrangement of components in a system that operates in an execution environment, such as execution environment 102 in FIG. 1. The arrangement of components in the system operates to perform the method illustrated in FIG. 2A. The system illustrated includes a query handler component 302, a identification request constructor (IRC) component 304, and a result handler component 306. A suitable execution environment includes a processor, such as processor 104, to process an instruction in at least one of a query handler component, a identification request constructor component, and a result handler component. FIG. 3B illustrates an arrangement of components in a system that operates to perform the method illustrated in FIG. 2B. The system illustrated includes a content manager component 309, a query handler component 302, a query director component 312, and a identification response builder (IRB) component 314. A suitable execution environment includes a processor, such as processor 104, to process an instruction in at least one of a content manager component, a query handler component, a query director component, and a identification response builder (IRB) component.

Some components, illustrated in the drawings are identified by numbers with an alphanumeric suffix. A component may be referred to generically in the singular or the plural by dropping a suffix of a portion thereof of the component's identifier. For example, window UI elements, such as a window UI element 602a in FIG. 6A, a window UI element 602b in FIG. 6B, and their adaptations and analogs; are referred to herein generically as a window UI element 602 or window UI elements 602 when describing more than one. Other components identified with an alphanumeric suffix may be referred to generically or as a group in a similar manner.

Figure 4:
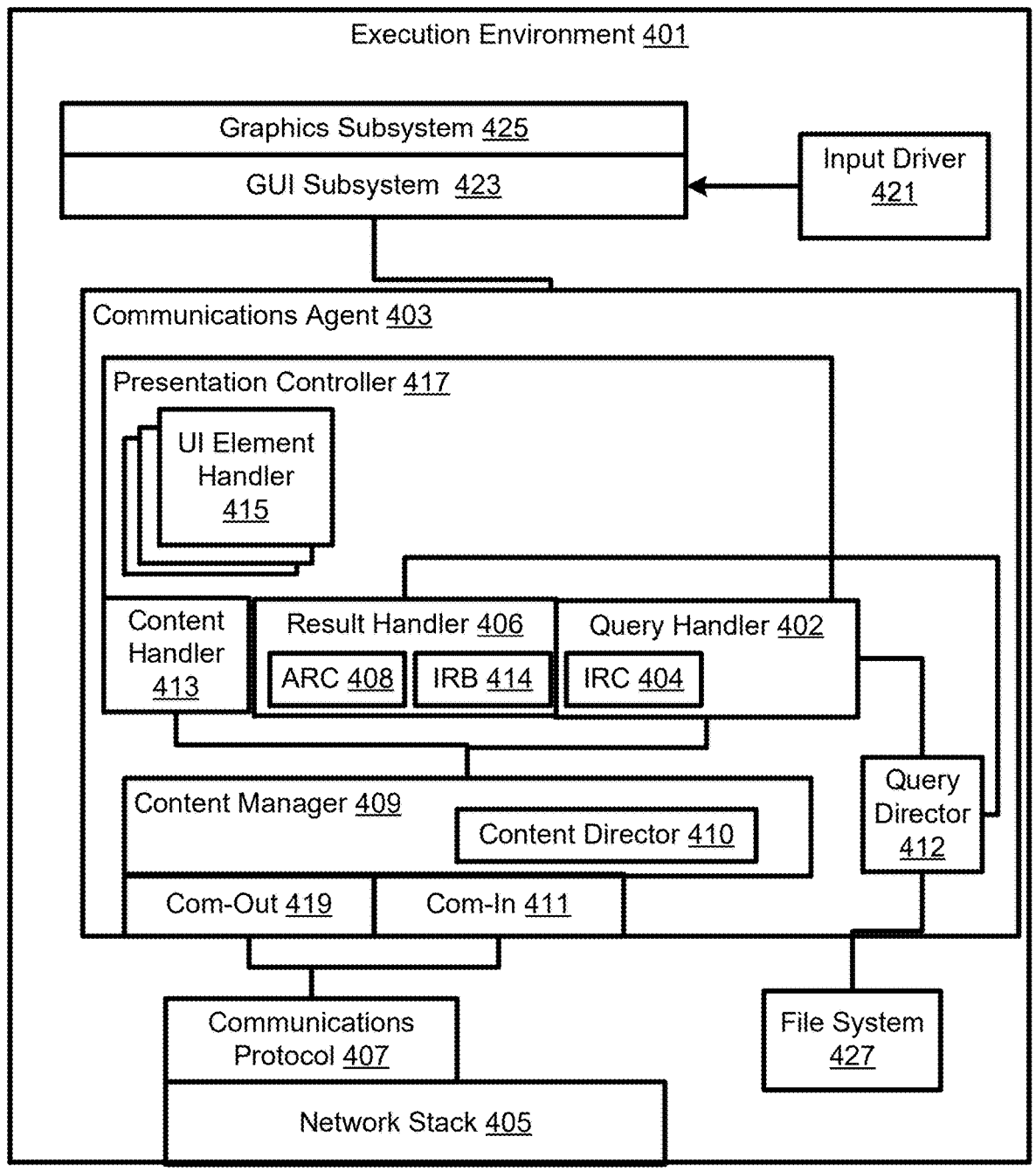
FIG. 4 is a block diagram illustrating an arrangement of components for processing a data object identification request in a communication according to another aspect of the subject matter described herein.

The arrangement components illustrated in FIG. 4 may be adapted to operate in a number of execution environments to perform the method illustrated in FIG. 2A and/or the method illustrated in FIG. 2B. FIG. 4 is a block diagram illustrating the components of FIG. 3A, FIG. 3B, and/or analogs of the components of FIG. 3A and FIG. 3B, respectively adapted to operate in an execution environment 401 that includes and/or otherwise is provided by one or more nodes. FIG. 1 illustrates key components of an exemplary device that may at least partially provide and/or otherwise be included in an execution environment. The components illustrated in FIG. 4 may be included in or otherwise combined with the components of FIG. 1 to create a variety of arrangements of components according to the subject matter described herein.

As stated, the various adaptations of the arrangement in FIG. 3A as well as the various adaptations of the arrangement in FIG. 3B illustrated and described herein are not exhaustive. For example, those skilled in the art will see based on the description herein that arrangements of components for performing the method illustrated in FIG. 2A and the method illustrated in FIG. 2B may each be distributed across more than one node and/or execution environment. For example, such an arrangements may operate at least partially in a browser in a one node and at least partially in a server in another node interoperating via a network.

Figure 5:
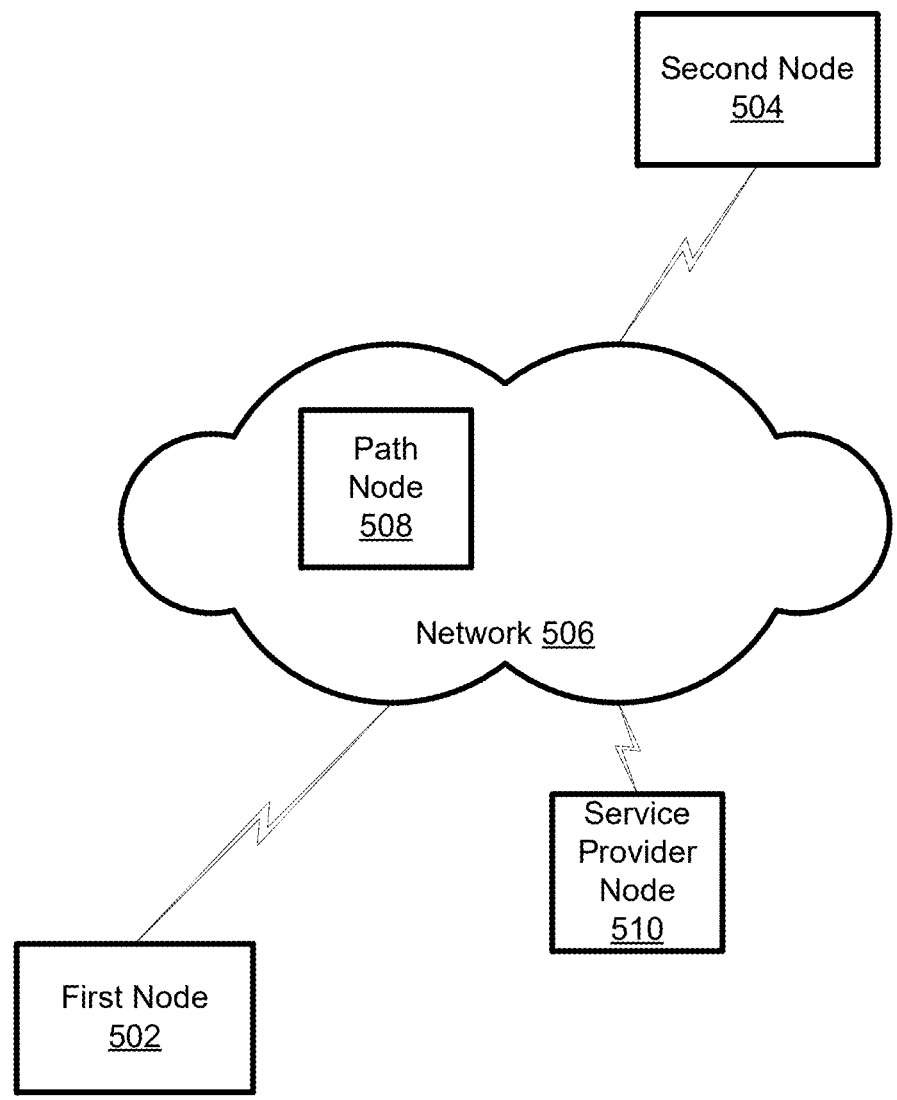
FIG. 5 is a network diagram illustrating a system for processing a data object identification request in a communication according to another aspect of the subject matter described herein.

FIG. 5 illustrates a first node 502 and an execution environment 401 of second node 504 as exemplary devices that each may be included in and/or otherwise adapted for providing an instance, adaptation, and/or analog of execution environment 401 in FIG. 4. As illustrated in FIG. 5, first node 502 and an execution environment 401 of second node 504 are operatively coupled to a network 506 via respective network interface components enabling first node 502 and execution environment 401 of second node 504 to exchange data in a communication on behalf of communicants represented by the respective nodes.

FIG. 4 illustrates communications agent 403 including an adaptation of the arrangement of components in FIG. 3A and an adaptation of the arrangement of components in FIG. 3B. A first communications agent 403 may operate, in first node 502, on behalf of a first communicant to communicate with a second communicant represented by a second communications agent 403 operating in execution environment 401 of second node 504.

Execution environment 401 is illustrated in FIG. 4 hosting communications agent 403. Components in FIG. 4 are referenced for illustrative purposes in describing communications agents operating in an execution environment of first node 502 and an execution environment of execution environment 401 of second node 504. Exemplary communications agents include email clients, phone clients including Voice over Internet Protocol (VoIP) clients, instant messaging clients, short message service (SMS) clients, multimedia message service (MMS clients), multi-media communications clients including video phone clients, and other data transfer agents.

Communications agents 403 in FIG. 4, respectively operating in first node 502 and in execution environment 401 of second node 504 in FIG. 5 may interoperate via respective network stacks 405. Communications agents 403 may communicate via one or more communications protocols. FIG. 4 illustrates communications protocol component 407 exemplifying a subsystem for exchanging data via network 506 according to one or more communications protocols, such as simple mail transfer protocol (SMTP), an instant messaging protocol, and/or a real-time voice and/or video protocol. A communication between communications agents 403 in first node 502 and execution environment 401 of second node 504 may include more than one type of data and may use one or more communications protocols in exchanging one or more types of data via network 506.

Instances, adaptations, and/or analogs of communications agent 403 in FIG. 4, in first node 502 and in execution environment 401 of second node 504, respectively, may communicate via discrete messages, a request/reply protocol, a data streaming protocol, a session and/or connection-oriented protocol, a connectionless protocol, a real-time communications protocol, an asynchronous communication, a store and forward communications protocol, a reliable delivery communications protocol, a best-effort delivery communications protocol, and/or a secure protocol, to name a few communications options.

FIG. 4 illustrates communications agent 403 including a content manager component 409. Content manager component 409 may interoperate with communications protocol layer component 407 and/or network stack 405 to receive data in one or more communications via network 506 with another communications agent in another node. Content manager component 409 is operatively coupled, via com-in component 411, to communications protocol component 407 for receiving the data from the other node.

Data received in a communication may include one or more resources and/or content types. Exemplary content types include plain text, markup such as hypertext markup language (HTML), audio data, image data, and/or executable data. Executable data may include script instruction(s), byte code, and/or machine code. In FIG. 4, communications agent 403 includes one or more content handler components 413 to process data received according to its content type. A data type may be identified by a MIME type identifier. Exemplary content handler components 413 include a text/html content handler component for processing HTML representations; an application/xmpp-xml content handler component for processing extensible messaging and presence protocol (XMPP) streams including presence tuples, instant messages, and audio content handlers including and/or configured to retrieve suitable codices; one or more video content handler components for processing video representations of various types; and still image data content handler components for processing various image data representations.

Content handler component(s) 413 process received data representations and may provide transformed data from the representations to one or more user interface element handler components 415. One or more user interface element handler components 415 are illustrated in a presentation controller component 417 in FIG. 4. Presentation controller component 417 may manage visual, audio, and other types of output for its including application as well as receive and route detected user and other inputs to components and extensions of its including application, communications agent 409. A user interface element handler component 415 may be adapted to operate at least partially in a content handler component 413 such as a text/html content handler component and/or a script content handler component. Additionally or alternatively, a user interface element handler component in an execution environment 401 may be received in a communication. For example, a communication, such as an email, may include an HTML content type portion and a script content type portion.

Figure 6A:
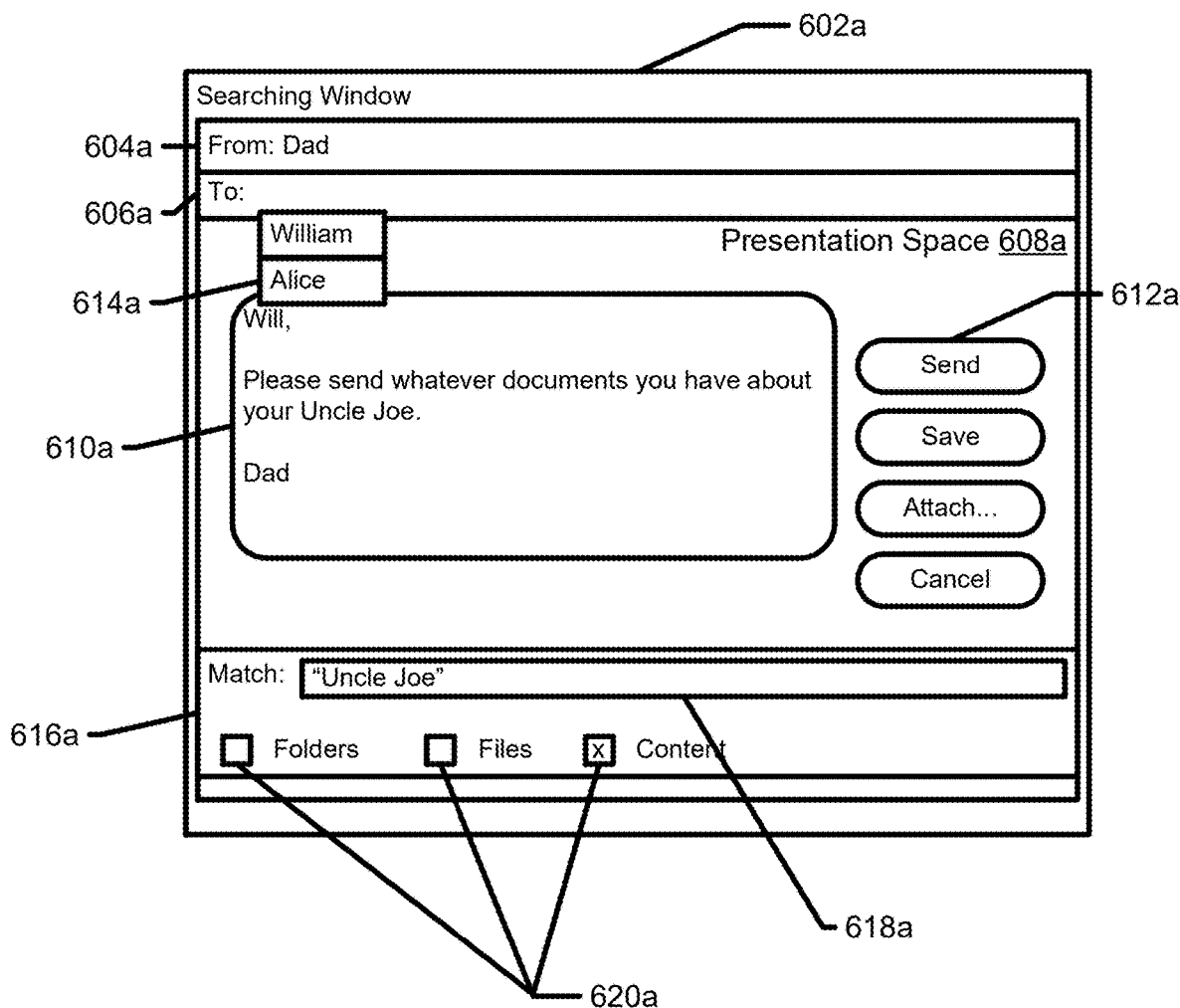
FIG. 6A is a diagram illustrating a user interface presented via a display according to another aspect of the subject matter described herein.

FIG. 6A-G illustrates various communications agent windows 602 presentable in a presentation space of a display device, such as output device 130 in FIG. 1. In FIG. 6a, a communications agent window 602a includes a contactor user interface (UI) element 604a for presenting an identifier of a communicant in the role of a contactor in a communication represented by the communications agent window 602a. A communications agent window 602a also includes a contactee UI element 606 for presenting one or more contactee identifier(s) identifying one or more communicants in the role of contactee(s) included in the communication. A presentation space 608 is provided by each communications agent window 602a for presenting a user message UI element 610 for presenting a message addressed to one or more contactees identified in a contactee UI element 606a. A presentation space 608a may also be provided for presenting one or more UI controls for exchanging data in and/or otherwise managing a communication. A send UI element 612a illustrates an exemplary UI element that may correspond to user input to send data in a communication to one or more identified contactees.

Data to send in a communication to a communications agent in execution environment 401 of second node 504 may be received by one or more content handler component(s) 413 operating in first node 502 to transform the data into one or more data representations suitable for transmitting in the communication and/or suitable for processing by the communications agent in execution environment 401 of second node 504. The one or more data representations may be provided to content manager component 409 for sending in the communication to execution environment 401 of second node 504. Content manager component 409 may package the one or more data representations in a message formatted according to a communications protocol of the communications agent. Communications protocol component 407 may send the data according to the specification(s) of the communications protocol. Content manager component 409 may alternatively or additionally encode and/or otherwise transform one or more of the data representations for sending in a data stream such as voice stream and/or a video stream for communicating in the communication to a communications agent via a network.

Content manager component 409 operating in execution environment 401 included in and/or otherwise provided by first node 502 may provide the packaged, encoded, and/or transformed data to communications protocol component 407 via a com-out component 419. Com-out component 419 as described above operatively couples communications agent 409 to communications protocol component 407 according to an interface provided by communications protocol component 407 for sending data in a communication according to a communications protocol. Communications protocol component 407 may further package and/or otherwise transform the data to send via network stack 405 for delivery via network 506 to execution environment 401 of second node 504.

As described above, a communications protocol may operate via one or more nodes in a network in a network path including a first node and an execution environment 401 of second node 504. Exemplary path nodes include mail relay nodes, phone switch nodes, and proxy nodes such as instant messaging proxies for communicating through firewalls. As indicated, path node 508 illustrates such a node.

Sending data in a communication requires identifying a contactee. A contactee may be represented by a communications address in an address space of a communications protocol. In one aspect, information identifying a communications address may be received from a user/communicant of a communications agent in a user node. In FIG. 4, presentation controller 417 and/or a UI element handler 415, presenting and/or managing interaction with contactor UI element 604 in FIG. 6A for first node 502, may receive a contactor alias in response to a user input corresponding to UI element handler 604. The user/communicant of first node 502 may enter a contactor alias, such as "Dad", via a keyboard and/or select a predefined communicant alias presented in a selection UI control element via a UI element handler component 415. The user input may be detected by input driver 421. Corresponding input information may be routed to presentation controller 417 by GUI subsystem 423. GUI subsystem 423 may send presentation information to a display device via a graphics subsystem 425. Communications agent 403 may identify a communication address associated with the contactor alias, "Dad". Other communications address(es), such as for one or more contactees, may be received similarly and/or in any suitable manner.

Data may be sent in a communication according to a form or type of the communication and/or other attribute of the communication such as a security attribute, the amount of data to be set, a priority setting, a task setting, and the like. Some forms of communication do not require a session and/or connection between a first node and an execution environment 401 of second node 504 in order to send data between the two nodes, while others do. An email and/or instant message may use a store and forward model of delivery.

Data may be sent in a communication in response to a communicant input. A contactor may provide an input corresponding to send UI element 612a in FIG. 6A. The input may be received by presentation controller component 417 and/or one or more UI element handlers 415 corresponding to send UI element 612a. In response to detecting the input, presentation controller component 417 may provide data to be sent in the communication to one or more content handler components 413 according to the content type(s) of the data to be sent.

The one or more content handler components 413 may encode, format, and/or otherwise transform the data for sending in a message, such as an email message. The one or more content handler components 413 may provide data to be sent to content manager 409, instructing content manager component 409 to send the data in the communication for delivery to a communications agent in execution environment 401 of second node 504. Content manager component 409 interoperating with com-out component 419 may further format and/or transform the data for sending in the communication according to communications protocol, for example according to an email communications protocol, by communications protocol component 407. Communications protocol component 407 may send the communication for delivery to the communications agent in execution environment 401 of second node 504 via network 506.

Path node 508 may relay data sent in the communication between first node 502 and execution environment 401 of second node 504. Path node 508 may determine a next node and/or a network interface in a network path communicatively coupling first node 502 and execution environment 401 of second node 504 for exchanging data in a communication between communications agents 403 in the first node 502 and in the execution environment 401 of second node 504.

For session-oriented and/or connection-oriented communication a session and/or connection may be established if a session/connection has not already been established. Data may be sent for delivery to a communications agent identified based on a contactee communications address during session and/or connection setup. For example, for a voice communication a voice communication may be established via a session initiation protocol. Communications protocol component 407 may operate according to the session initiation protocol specifications. Communications protocol component 407 operating in first node 502 may locate a communications agent by communicating with one or more nodes in network 506 according to the session initiation protocol. Communications protocol component 407 may locate a communications agent in execution environment 401 of second node 504, based on a communications address for the contactee located based on the contactor alias.

Once a communication session is established, such as a voice session, data may be sent according to the session communications protocol, such as RTP. Data may be sent according to the session initiation protocol in the communication for managing the voice communication session and/or for exchanging text, image, and/or other data outside of the voice session. Path node 508 may be included in session and/or connection setup. Alternatively or additionally, path node 508 may be included in a network path in a session and/or connection.

With reference to FIG. 2A, a block 202 illustrates that the method includes receiving, by a first communications agent in a first execution environment from a first user represented by the first communications agent, data object information identifying a data object matching criterion. Accordingly, a system for processing a data object identification request in a communication includes means for receiving, by a first communications agent in a first execution environment from a first user represented by the first communications agent, data object information identifying a data object matching criterion. For example, the arrangement in FIG. 3A, includes query handler component 302 that is operable for receiving, by a first communications agent in a first execution environment from a first user represented by the first communications agent, data object information identifying a data object matching criterion. FIG. 4 illustrates query handler component 402 as an adaptation and/or analog of the query handler component 302 in FIG. 3A. One or more query handler components 402 operate in an execution environment 401. The system for processing a data object identification request in a communication includes one or more processors and logic encoded in one or more tangible media for execution by the one or more processors that when executed is operable for receiving, by a first communications agent in a first execution environment from a first user represented by the first communications agent, data object information identifying a data object matching criterion. In FIG. 4, query handler component 402 is illustrated as a component of communications agent 403.

Figure 7:
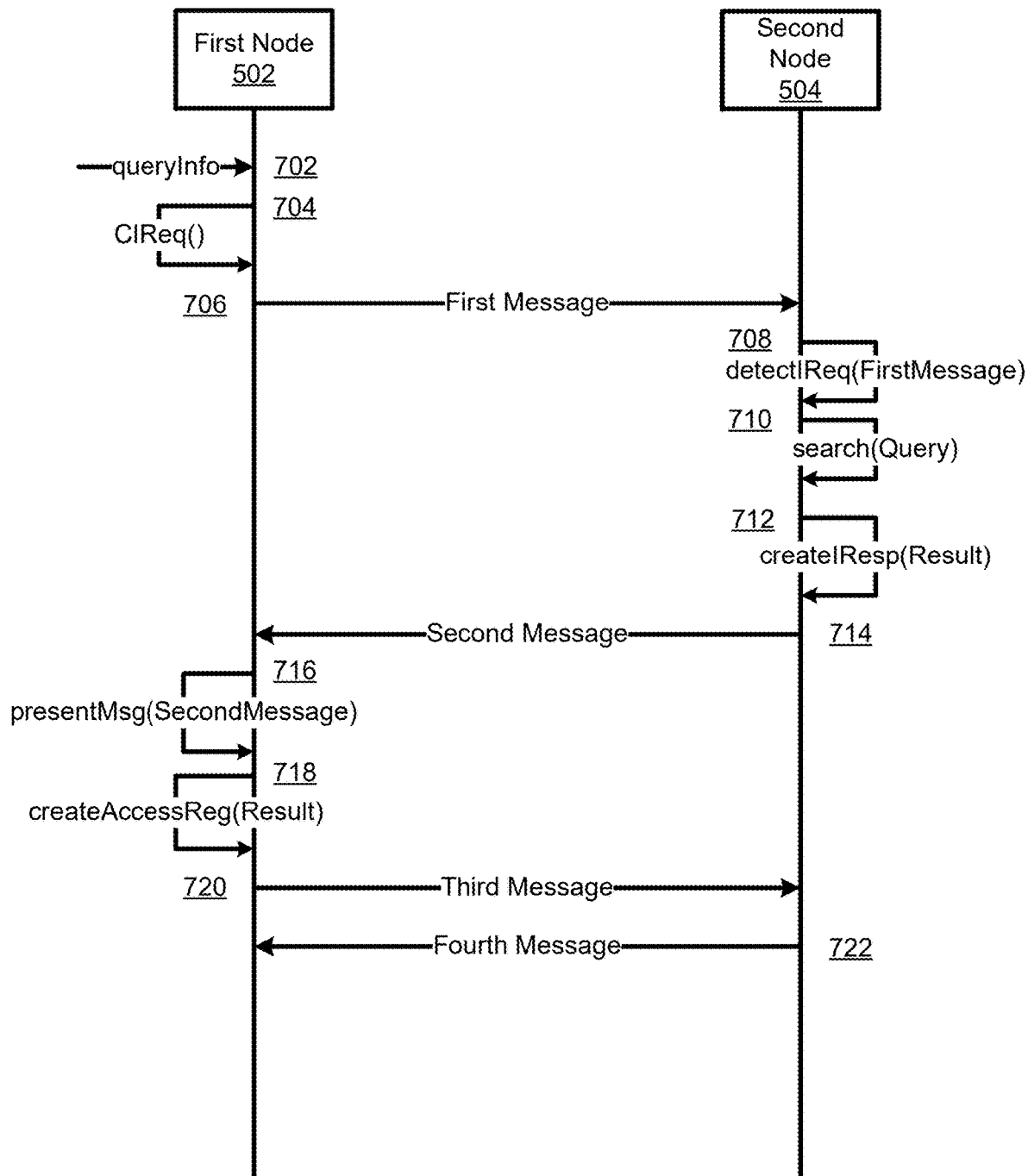
FIG. 7 is a message flow diagram illustrating an exemplary data and execution flow for processing a data object identification request in a communication according to an aspect of the subject matter described herein.

FIG. 7 includes dataflow message 702 that illustrates a data flow internal to execution environment 401 of first node 502 and/or a message received via network 506 by execution environment 401 of first node 502. Dataflow message 702 illustrates a data object information dataflow to query handler component 402 operating in execution environment 401 of first node 502. Data object information is identified to and/or otherwise received by query handler component 402.

In various aspects, a query handler component 402 may receive data object information from a user via one or more UI element handler components 415. The data object information may be received, in response to a user input detected by an input device of an execution environment 401 that includes the query handler component 402. Alternatively or additionally, data object information may be received by a query handler component in a message received via a network. For example, a user may identify data object information to a browser operating in a client node. The browser may send the data object information via a network communicatively coupling the client node to a web service provider node. The web service provider node may include a query handler component that may operate to receive the data object information identified in the message from the browser. FIG. 6A illustrates an exemplary user interface that may be presented by communications agent 403 operating in execution environment 401 of first node 502. A UI element handler component 415 may operate to present a user interface element to allow a user to identify data object information. A data object information (DOI) UI element 616a is illustrated in FIG. 6A as an example. The same or different UI element handler component 415 may present various other UI elements included in DOI UI element 616a. DOI UI element 616a and one or more UI elements it includes may be presented by one or more corresponding UI element handler component(s) 415 that may operate based on a schema that defines valid data object information and/or data object identification requests for including in a communication via a communications agent 403. The schema defines one or more rules and/or a vocabulary that defines whether data object information and/or a data object identification request is valid. Those skilled in the art will understand that numerous languages and/or schemas for providing data object information and/or data object identification requests currently exist including relatively simple key word based queries to relatively more complicated regular expression languages and data base query languages, such as various versions of structured query language (SQL). New schemas are and will be created, and are, thus, considered within the scope of the subject matter described herein.

DOI UI element 616a illustrates a user interface for a keyword based schema. Match textbox UI element 618a illustrates a textbox allowing a user to enter a keyword expression. Various checkbox UI elements 620a allow a user to define a scope of a data object identification request by identifying whether a resulting data object identification request is to be applied to folders, files, and/or content of files in a file system and/or other data store of a receiving execution environment. A communications agent 403 may support more than one data object identification request schema and/or corresponding data object information schema. Thus. a communications agent may provide a user interface to receive valid data object information for each respective schema.

Returning to FIG. 2A, a block 204 illustrates that the method further includes sending, according to a first communications protocol via a network in a communication to a second communications agent in a second execution environment representing a second user, a first message including a data object identification request based on the data object matching criterion, wherein the first message is addressed to the second user. Accordingly, a system for processing a data object identification request in a communication includes means for sending, according to a first communications protocol via a network in a communication to a second communications agent in a second execution environment representing a second user, a first message including a data object identification request based on the data object matching criterion, wherein the first message is addressed to the second user. For example, the arrangement in FIG. 3A, includes identification request constructor component 304 that is operable for sending, according to a first communications protocol via a network in a communication to a second communications agent in a second execution environment representing a second user, a first message including a data object identification request based on the data object matching criterion, wherein the first message is addressed to the second user. FIG. 4 illustrates identification request constructor component 404 as an adaptation and/or analog of identification request constructor component 304 in FIG. 3A. One or more identification request constructor components 404 operate in an execution environment 401. The system for processing a data object identification request in a communication includes one or more processors and logic encoded in one or more tangible media for execution by the one or more processors that when executed is operable for sending, according to a first communications protocol via a network in a communication to a second communications agent in a second execution environment representing a second user, a first message including a data object identification request based on the data object matching criterion, wherein the first message is addressed to the second user. In FIG. 4, identification request constructor component 404 is illustrated as a component of communications agent 403.

FIG. 7 includes dataflow message 704 that illustrates a data flow internal to execution environment 401 of first node 502 and/or message received via network 506 by execution environment 401 of first node 502. Dataflow message 704 illustrates a create data object identification request (CIReq) dataflow to an IRC component 404 operating in execution environment 401 of first node 502. Data object information may be identified to and/or otherwise provided to IRC component 404. A query handler component 402, operating as described with respect to block 202 of FIG. 2A, may identify and/or otherwise provide data object information to an IRC component 404.

A query handler component may be a type of content handler component that operates to process data object information to create a data object identification request that conforms to a schema for creating and/or otherwise constructing a valid data object identification request. The IRC component 404 may construct and/or otherwise create a data object identification request based on a schema that defines and/or otherwise identifies a valid data object identification request and/or a valid data object identification response for a particular type of communication supported by a communications agent. The data object identification response is constructed and/or otherwise created, based on the data object information, by the IRC component 404. IRC component 404 in execution environment 401 of first node 502 may provide the data object identification request to content manager component 409 to include and/or otherwise identify the data object identification request in a communication with execution environment 401 of second node 504, such as email and/or instant message. Content manager component 409 may interoperate with other types of content handler components 413 to create and/or otherwise construct a message that includes the valid data object identification request.

In an aspect, the IRC component 404 may interoperate with the content manager component 409 to create the valid data object identification request according to a specified schema for the message, so that the message is valid according to a communications protocol supported by a communications protocol component 407 that operates to send the message. As described above, the content manager component 409 may operate in an execution environment 401 of first node 502 along with an IRC component 404 to transform data object information into a data object identification request to include along with data for other parts of a communication into one or more representations suitable for transmitting in a communication to another node, such as execution environment 401 of second node 504. Some or all of the representations transmitted are suitable for processing by the communications agent in execution environment 401 of second node 504. The content manager component 409 in the execution environment 401 of first node 502 may package the one or more data representations including a representation of the data object identification request into a message formatted according to the communications protocol.

In FIG. 8A, a portion of an email communication 800a is illustrated formatted as a multipart/mixed content type including data object identification request portion 802a. A data object identification request portion of a communication may be identified as a data object identification request by its location in the communication and/or by an identifier or markup element, such as a MIME type identifier. A data object identification request may be detected based on content included in the message and/or based on metadata such as content-type header 804a identifying a MIME type identifier, such as "application/id-request", which may be defined for representing one or more matching criteria in a data object identification request. The "application/id-request" MIME type identifier is exemplary. Other MIME type identifiers exist and/or may be defined to identify a data object identification request in a communication.

An IRC 404 and/or a content manager component 409 may operate to construct a data object identification request in a communication based on XQuery, regular expression, and/or SQL content—to name a few examples. A content type identifier may be included in a position and/or location that identifies a data object identification request in a communication. The position or location may be absolute or relative. For example, a schema for a communication may define that a data object identification request in a communication is included in the communication at the end of the communication. There may be one or more data object identification requests at the end. In another aspect, a schema for a communication may specify that a portion of a communication following a particular type of message portion is a data object identification request. Other data object identification requests may follow. If no data object identification request is included, the data object identification request portion may include no content or may include an indicator that no data object identification request is included.

FIG. 8A illustrates an "application/id-request" MIME type identifier that may be defined to identify a schema for an XML-based language for specifying id-request XML documents. FIG. 8A illustrates id-request document 806a. Id-request document 806a, as illustrated, includes criterion tag elements 808a corresponding to the form elements in the user interface illustrated in FIG. 6A. A criterion tag element 808a identifies a data object matching criterion name, such as "query" indicating that the criterion is a query expression or a portion thereof. A "type" attribute identifies a schema with the identifier "keyword" for the expression. The criterion tag element 808a identifies a value for a query "Uncle Joe" in a match-expression attribute. Another criterion tag element 808a specifies a scope query specified in the first criterion tag element. FIG. 8A illustrates an "and" tag 810a indicating that all the matching criteria must be met in identifying a data object. An "or" tag (not shown) may be defined by a schema for id-request documents. Other operator elements and operator precedence may be defined by the schema. Grouping elements for managing operator precedence, such as a parenthesis element, may be defined by the schema.

FIG. 7 includes dataflow message 706 that illustrates a first message, including a data object identification request, sent via network 506 by execution environment 401 of first node 502 to execution environment 401 of second node 504.

A data object identification request generated by an IRC component 404, along with a user message and any other data to include in a communication, may be provided and/or otherwise identified to content manager component 409 for sending in the communication. The content manager component 409 in execution environment 401 of first node 502 may package the data including a representation of the data object identification request into the message formatted according to the communications protocol. Com-out component 419 may provide the data object identification request, the user message, and any other data for sending in the communication in representations suitable for sending by communications protocol component 407 to the communications agent in execution environment 401 of second node 504. Communications protocol component 407 operating in execution environment 401 of first node 502 may send the data as and/or in a communication, such as an email message, according to the specification(s) of the communications protocol. Communications protocol component 407 may further package and/or otherwise transform the data to send via network stack 405 for delivery via network 506 to execution environment 401 of second node 504.

Content manager component 409 may alternatively or additionally encode and/or otherwise transform one or more of the data representations for sending in a data stream such as voice stream and/or a video stream for communicating in a communication with the communications agent in execution environment 401 of second node 504.

Returning to FIG. 2A, a block 206 illustrates that the method yet further includes receiving, by the first communications agent in response to sending the data object identification request in the first message, a second message that includes a data object identification response that identifies a data object in a second data store in the second execution environment, wherein the second message is addressed to the first user and the data object is not received in the second message. Accordingly, a system for processing a data object identification request in a communication includes means for receiving, by the first communications agent in response to sending the data object identification request in the first message, a second message that includes a data object identification response that identifies a data object in a second data store in the second execution environment, wherein the second message is addressed to the first user and the data object is not received in the second message. For example, the arrangement in FIG. 3A, includes result handler component 306 that is operable for receiving, by the first communications agent in response to sending the data object identification request in the first message, a second message that includes a data object identification response that identifies a data object in a second data store in the second execution environment, wherein the second message is addressed to the first user and the data object is not received in the second message. FIG. 4 illustrate result handler components 406 as an adaptations and/or analogs of result handler component 306 in FIG. 3A. One or more result handler components 406 operate in an execution environment 401. The system for processing a data object identification request in a communication includes one or more processors and logic encoded in one or more tangible media for execution by the one or more processors that when executed is operable for receiving, by the first communications agent in response to sending the data object identification request in the first message, a second message that includes a data object identification response that identifies a data object in a second data store in the second execution environment, wherein the second message is addressed to the first user and the data object is not received in the second message. In FIG. 4, a result handler component 406 is illustrated as a component of application 403.

FIG. 7 includes dataflow message 714 that illustrates a second message, including a data object identification response, received via network 506 by execution environment 401 of first node 502 from execution environment 401 of second node 504.

In addition to packaging communication information including a data object identification request into a valid communication, content manager component 409 operating in execution environment 401 of first node 502 may interoperate with communications protocol layer component 407 and/or network stack 405 to receive data in one or more communications via network 506 with another communications agent in another node. A result handler component 406 may receive some or all of the communication in receiving and/or otherwise identifying a data object identification response in the communication. Content manager component 409 in FIG. 4 operatively couples result handler component 406 with network 506, via com-in component 411, communications protocol component 407 and/or network stack 405 to receive the data from the other node. Thus, execution environment 401 of first node 502 may receive a communication, via content manager component 409 and result handler component 406, that includes a data object identification response that is a response to a data object identification request detected by execution environment 401 of second node 504 in a message received previously from the execution environment 401 of first node 502.

Com-in component 411 may provide data received in a communication to content manager component 409. Content handler component 409 may identify a data object identification response in the communication sent from the execution environment 401 of second node 504. Content manager component 409 may interoperate with result handler component 406 in identifying the data object identification response. The data object identification response may be identified by content manager component 409 according to a schema for the communication. For example, a portion of an email message may include a MIME-type identifier that identifies a corresponding part of the email as a data object identification response and/or otherwise identifies the part for routing to a result handler component 406 in communications agent 403 in execution environment 401 of first node 502 for detecting the data object identification response.

Data sent in second message 714, by execution environment 401 of second node 504, may be received by com-in component 411 operating in an instance, adaptation, and/or analog of execution environment 401 including and/or provided by first node 502. The received communication includes a message addressed to the a communicant represented by communications agent 403 in first node 502 and a data object identification response identifying a data object located and/or otherwise identified based on the data object identification request identified by first message 706. Content manager component 409 may detect the user message, such as message portion 802*b* in second message 714. Content manager component 409 may detect a data object identification response, such as data object identification response portion 804*b* in second message 714. Message portion 802*b* and data object identification response portion 804*b* may be provided to suitable content handler components 413 based on the content types of the message portion and the data object identification response portion detected by content manager component 409. In FIG. 4, data object identification response portion 804*b* may be provided to result handler component 406 as a content handler that matches the MIME type field 806*b* illustrated in FIG. 8A.

In an aspect, a data object identification response that is a response to a data object identification request sent in a previous message may include information identifying one or more data objects located and/or otherwise identified by the execution environment 401 of second node 504 that processed the data object identification request. For example, a data object identification response may be sent that identifies a URI for each data object located and/or otherwise identified by a first node in response to processing a corresponding data object identification request.

Returning to FIG. 2A, a block 208 illustrates that the method yet further includes sending, based on the data object identification response, a third message, via the network by the first execution environment, to access the data object. Accordingly, a system for processing a data object identification request in a communication includes means for sending, based on the data object identification response, a third message, via the network by the first execution environment, to access the data object. For example, the arrangement in FIG. 3A, includes access request constructor component 313 that is operable for sending, based on the data object identification response, a third message, via the network by the first execution environment, to access the data object. FIG. 4 illustrates access request constructor component 408 as an adaptation and/or analog of access request constructor component 308 in FIG. 3A. One or more access request constructor components 408 operate in an execution environment 401. The system for processing a data object identification request in a communication includes one or more processors and logic encoded in one or more tangible media for execution by the one or more processors that when executed is operable for sending, based on the data object identification response, a third message, via the network by the first execution environment, to access the data object. In FIG. 4, a access request constructor component 408 is illustrated as a component of result handler component 406.

FIG. 7 includes dataflow message 716 that illustrates a present message that may be internal to execution environment 401 of first node 502 and/or may be a message sent to a remote device, such as a node including a browser, to send presentation information to present, via an output device, a representation of the data object identification response received in second message 714. FIG. 7 also includes dataflow message 718 that illustrates a create access request message that may be a data flow internal to execution environment 401 of first node 502 and/or a message received via network 506 by execution environment 401 of first node 502. In the dataflow message 718 an ARC component 408 operating in execution environment 401 of first node 502 may be invoked to operate based on result information. Result information may be identified to and/or otherwise by ARC component 408 as part of and/or in response to being invoked.

Result handler component 406 may be a type of content handler component 413 that operates to process data representations and may provide transformed data from the representations to one or more user interface element handler components 415. Result content handler component 406 may operate to process data object identification responses according to a schema defining valid data object identification responses. Content manager component 409 may provide and/or otherwise identify various portions of a communication, such as a data object identification response, to one or more content handler components 413. The data object identification response may be provided to result handler component 404. In an aspect, result handler component may interoperate with the presentation controller component 417 in the execution environment 401 of first node 502 to present the data received in the data object identification response and/or other data received in the communication.

Figure 6B:
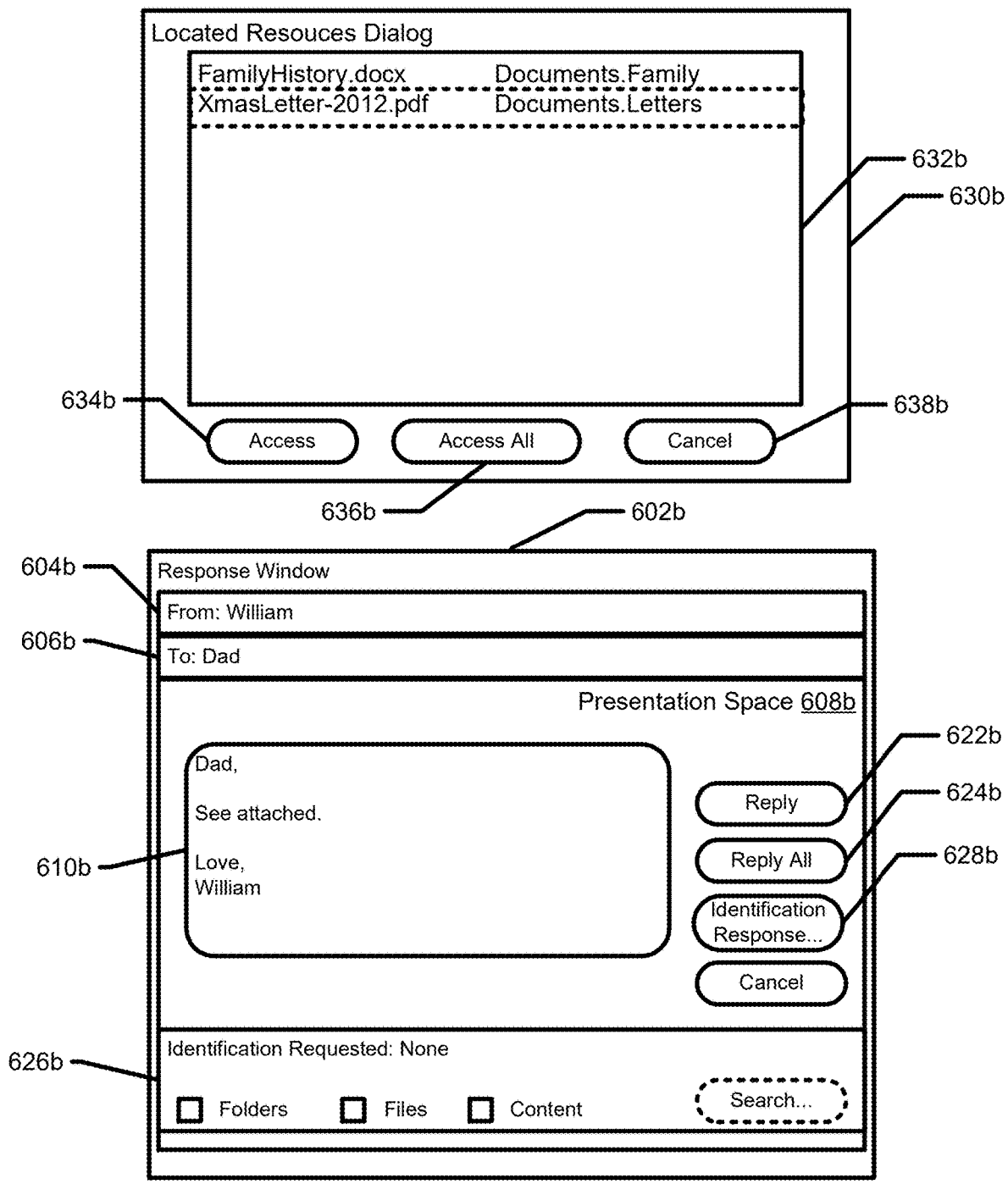
FIG. 6B is a diagram illustrating a user interface presented via a display according to another aspect of the subject matter described herein.

FIG. 6B illustrates a response window UI element 602*b* as an exemplary user interface that may be presented by communications agent 403 operating in execution environment 401 of first node 502 to present data received in a communication from execution environment 401 of second node 504. FIG. 6B illustrates a contactor UI element 604*b*, a contactee UI element 606*b*, a presentation space 608*b* of the response window UI element 602*b*. Presentation space 608 includes a user message UI element 610*b*, analogous to similar UI elements described with respect to FIG. 6A. The various UI elements may be presented by one or more UI element handler components 415 in the communications agent 402 in execution environment 401 of first node 502. A reply UI element 622*b* and a reply all UI element 624*b* illustrate UI elements in presentation space 608*b* presented to allow a user of the execution environment 401 of first node 502 to respond and/or otherwise instruct execution environment 401 of first node 502 to perform an operation based on the message received in the communication. FIG. 6B illustrates a data object identification requested query UI interface element 626*b* where the presented term "None" may be defined to indicate no data object identification request was detected by the content manager component 409 in execution environment 401 of first node 502 in the communication received by execution environment 401 of first node 502 from second node 504 via network 506.

Response window UI element 602*b* in FIG. 6B includes a data object identification response UI element 628*b* for receiving user input to display a representation of one or more data objects located and/or otherwise identified by the execution environment 401 of second node 504 and identified in the data object identification response. One or more of the data objects is not included in the message received in the communication. In response to an input directed to data object identification response UI element 628*b*, a corresponding UI element handler 415 may interoperate with result handler component 406 to present a located data resources dialog UI element 630*b* that includes a presentation space 632*b* for presenting a user detectable representation of some or all of the data objects identified in the received data object identification response from the execution environment 401 of second node 504. In an aspect, one or more data objects located and/or otherwise identified by execution environment 401 of second node 504 may be included in a communication as attachments. In a further aspect, located and/or otherwise identified data objects not included in the message may be identified as described with respect to located and/or otherwise identified data objects dialog UI element 630*b* and/or in any other suitable manner. In yet another aspect, files and/or other data entities identified in the data object identification response may be illustrated in a manner similar to attachments rather than in a separate UI element as in FIG. 6B, and accessed from first node 504 via network 506 as described below.

FIG. 6B illustrates an access UI element 634*b* and an access all UI element 636*b* allowing a user to provide user input(s) to instruct communications agent 403 in execution environment 401 of first node 502 to request one or more data objects identified in the data object identification response.

FIG. 7 includes a dataflow message 720 that illustrates a third message that includes an access request to access a data object identified in the data object identification response received in second message 714. FIG. 7 illustrates the access request is sent via network 506 by execution environment 401 of first node 502 to execution environment 401 of second node 504.

Figure 6C:
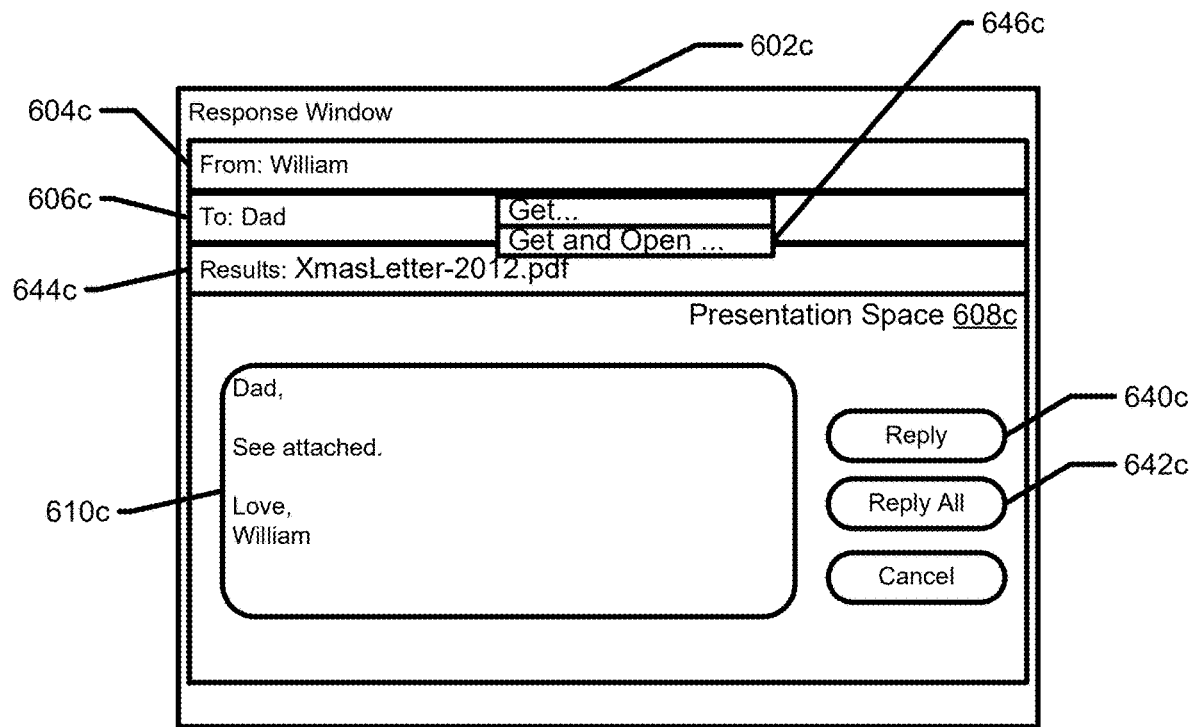
FIG. 6C is a diagram illustrating a user interface presented via a display according to another aspect of the subject matter described herein.

In response to receiving second message 714, execution environment 401 of first node 502 may present, in a manner described above, data received in the message to a user of execution environment 401 of first node 502 as described with respect to FIG. 6C. Context menu 646*c* provides UI elements to allow the user to instruct execution environment 401 of first node 502 to retrieve a data object identified in a data object identification response received from execution environment 401 of second node 504. In response to a user input corresponding to a context menu item included in context menu 646*c* a corresponding UI element handler component 415 may invoke ARC component 408 to construct an access request to retrieve one or more data objects identified in the data object identification response. FIG. 6G illustrates another exemplary user interface that execution environment 401 of first node 502 may present to the user to allow the user to instruct execution environment 401 of first node 502 to construct and send a request. Auto-response window 602*g* may be presented in response to a data object identification response received in a communication without a user message. Rather than a UI element for displaying a user message, a results pane UI element 670*g* may be presented that identifies data objects located and/or otherwise identified by execution environment 401 of second node 504 that may be retrieved by execution environment 401 of first node 502. In an aspect, execution environment 401 of second node 504 may process a data object identification request and automatically send a data object identification response without involving the user of execution environment 401 of second node 504. The data object identification response may be received without a user message as FIG. 6G illustrates or may be received with a pre-written and/or automatically generated message. UI elements 672*g*-674*g* may be presented by execution environment 401 of first node 502 to allow the user of execution environment 401 of first node 502 to request the retrieval of one or more data objects identified in the data object identification response.

ARC component 408 may be invoked to construct an access request to retrieve one or more data objects identified in the data object identification response. An access request may be based on a URL, such as an HTTP and/or FTP URL that identifies and locates a data object. Alternatively or additionally, an access request may be sent in a communication supported by a communications agent 403, in a manner analogous to that illustrated with respect to FIG. 9A. See U.S. patent application Ser. No. 12/833,014 (published US 2012-0011207 A1) filed on 2010 Jul. 9, entitled "Methods, Systems, and Program Products for Processing a Request for a Resource in a Communication" and application Ser. No. 12/833,016 (published US 2012-0011444 A1) filed on 2010 Jul. 9, entitled "METHODS, SYSTEMS, AND PROGRAM PRODUCTS FOR REFERENCING AN ATTACHMENT IN A COMMUNICATION". As described above, content manager component 409 in execution environment 401 of first node 502 may package the one or more data representations including a representation of an access request into a message in a communication. The message is formatted according to a communications protocol supported by communications agent 403 in execution environment 401 of first node 502. Communications protocol component 407 operating in execution environment 401 of first node 502 may send the message according to the specification(s) of the communications protocol. Content manager component 409 may alternatively or additionally encode and/or otherwise transform one or more of the data representations for sending in a data stream such as voice stream and/or a video stream for communicating in a communication.

Content manager component 409 operating in execution environment 401 included in and/or otherwise provided by execution environment 401 of first node 502 may provide the packaged, encoded, and/or transformed data to communications protocol component 407 via a com-out component 419. Com-out component 419 as described above operatively couples communications agent 409 to communications protocol component 407 according to an interface provided by communications protocol component 407 for sending data in a communication according to a communications protocol. Communications protocol component 407 may further package and/or otherwise transform the data to send via network stack 405 for delivery via network 506 to execution environment 401 of second node 504.

Returning to FIG. 2A, a block 210 illustrates that the method yet further includes receiving, via the network by the first execution environment and in response to sending the third message, at least a portion of the data object. Accordingly, a system for processing a data object identification request in a communication includes means for receiving, via the network by the first execution environment and in response to sending the third message, at least a portion of the data object. For example, the arrangement in FIG. 3, includes content director component 310 that is operable for receiving, via the network by the first execution environment and in response to sending the third message, at least a portion of the data object. FIG. 4 illustrates content director component 410 as an adaptation and/or analog of content director component 310 in FIG. 3. One or more content director components 410 operate in an execution environment 401. The system for content director includes one or more processors and logic encoded in one or more tangible media for execution by the one or more processors that when executed is operable for receiving, via the network by the first execution environment and in response to sending the third message, at least a portion of the data object. In FIG. 4, a content director component 410 is illustrated as a component of communications agent 403.

FIG. 7 includes dataflow message 722 that illustrates a fourth message that includes an access response received via network 506 by execution environment 401 of first node 502 from execution environment 401 of second node 504.

As described above, content manager component 409 operating in execution environment 401 of first node 502 may interoperate with communications protocol layer component 407 and/or network stack 405 to receive data in a communication, via network 506, with another communications agent in another node. Content manager component 409 is operatively coupled, via com-in component 411, to communications protocol component 407 to receive the data from the other node. Thus, execution environment 401 of first node 502 may receive a message in a communication with first node 504 via a com-in component 411. The message includes an access response to an access request.

Content director component 410 may be included in content manager component 409 to detect one or more portions of a received message, such as a portion that is a response to an access request. Content director component 410 may invoke one or more content handler components 413 to process one or more data objects provided in the message according to their type.

In one aspect, a data object returned in a message in response to access request may be processed as an attachment and/or in a manner analogous to processing of an attachment for a particular communications type.

With reference to FIG. 2B, a block 212 illustrates that the method includes receiving, via a network by a second communications agent representing a second user and operating in a second execution environment, a first message from a first communications agent representing a first user and operating in a first execution environment. Accordingly, a system for processing a data object identification request in a communication includes means for receiving, via a network by a second communications agent representing a second user and operating in a second execution environment, a first message from a first communications agent representing a first user and operating in a first execution environment. For example, the arrangement in FIG. 3B, includes content manager component 309 that is operable for receiving, via a network by a second communications agent representing a second user and operating in a second execution environment, a first message from a first communications agent representing a first user and operating in a first execution environment. FIG. 4 illustrates content manager component 409 as an adaptation and/or analog of content manager component 309 in FIG. 3B. One or more content manager components 409 operate in an execution environment 401. The system for processing a data object identification request in a communication includes one or more processors and logic encoded in one or more tangible media for execution by the one or more processors that when executed is operable for receiving, via a network by a second communications agent representing a second user and operating in a second execution environment, a first message from a first communications agent representing a first user and operating in a first execution environment. In FIG. 4, a content manager component 409 is illustrated as a component of communications agent 403.

As described above, FIG. 7 illustrates first message 706, including a data object identification request, received via network 506 by execution environment 401 of second node 504 from execution environment 401 of first node 502.

In addition to packaging representations of data in a structure and/or format for sending a message according to a communications protocol, a content manager component 409 may operate to detect a data object identification request received and/or otherwise identified in a message received in a communication. Content manager component 409 operating in execution environment 401 of second node 504 may receive the message, illustrated by first message 706, in a communication with execution environment 401 of first node 502. Com-in component 411 in execution environment 401 of second node 504 may receive the message via communication protocol component 407 and network stack 405. First message 706 may be delivered to execution environment 401 of second node 504 via network 506 based on a communications address of a communicant represented by communications agent 403 in execution environment 401 of second node 504. A communications agent may represent more than one communicant, which may be identified by different addresses.

The first message 706 in FIG. 7 may be received in one or more packets via network 506 by network stack 405 and communications protocol component 407 in an instance of and/or analog of execution environment 401 including and/or otherwise provided by execution environment 401 of second node 504. The data in the communication may be received by com-in component 411. Com-in component 411 may provide the data to content manager component 409. Content manager component 409 may determine one or more content types of the data. The content and/or portions of the content may be provided to one or more content type handler components 413 based on the one or more content types identified by content manager component 409. For example, FIG. 8A illustrates message portion 812a including "text/plain" MIME type identifier 814a as a content type identifier. Message portion 812a may be provided to a text/plain content handler 413. Audio data in a voice communication may be provided to an audio content handler component 413, and video data in a video communication may be provided to a video content handler component 413.

Returning to FIG. 2B, a block 214 illustrates that the method further includes detecting, by the second communications agent, a data object identification request included in the first message. Accordingly, a system for processing a data object identification request in a communication includes means for detecting, by the second communications agent, a data object identification request included in the first message. For example, the arrangement in FIG. 3B, includes query handler component 302 that is operable for detecting, by the second communications agent, a data object identification request included in the first message. FIG. 4 illustrates query handler component 402 as an adaptation and/or analog of query handler component 302 in FIG. 3B. One or more query handler components 402 operate in an execution environment 401. The system for processing a data object identification request in a communication includes one or more processors and logic encoded in one or more tangible media for execution by the one or more processors that when executed is operable for detecting, by the second communications agent, a data object identification request included in the first message. In FIG. 4, query handler component 402 is illustrated as a component of communications agent 403.

FIG. 7 includes a dataflow message 708 that illustrates a detect data object identification request dataflow that may be internal to execution environment 401 of second node 504 and/or may include interoperation with another node via a network. With respect to FIG. 4, dataflow message 708 may correspond to a data exchange and/or other interoperation between content handler component 409 and query handler component 402 to detect and/or otherwise process the data object identification request received in first message 706 by execution environment 401 of second node 504. FIG. 7 further includes a dataflow message 710 that illustrates a search message for locating one or more data objects based on the data object identification request. The data object identification request may include and/or otherwise identify a data object matching criterion identified by data object information identified by the communicant represented by execution environment 401 of first node 502. The one or more data objects may be located and/or otherwise identified by determining a data object or data objects that match the data object matching criterion. The data object(s) may be in a data store accessible to execution environment 401 of second node 504, such as one or more files in a file system of execution environment 401 of second node 504. Dataflow message 710 may be internal to execution environment 401 of second node 504 and/or may be a message sent to a remote device, such as database server and/or a network attached storage device providing storage locations for some or all of a file system of execution environment 401 of second node 504.

Com-in component 411 in execution environment 401 of second node 504, as described above, provides the message, received from execution environment 401 of first node 502, to content manager component 409. Content manager component 409 is operatively coupled, via com-in component 411, to communications protocol component 407 for receiving data in communications with other nodes, such as execution environment 401 of first node 502. Thus, execution environment 401 of second node 504 may receive a message via a com-in component 411 in a communication with execution environment 401 of first node 502. The message may include a data object identification request based on data object information identified by a user to communications agent 403 in execution environment 401 of first node 502.

Data received in a communication, which may for example include a voice session and/or an instant message, may include data of various content types. In FIG. 4, communications agent 403 in execution environment 401 of second node 504 includes one or more content handler components 413 to process data received according to its content type. Content manager component 409 may detect and/or otherwise identify a portion of the message as the data object identification request sent from execution environment 401 of first node 502. The data object identification request may be identified by content manager component 409 according to a schema for the message and/or a schema for the data object identification request. For example, a portion of the message may include a MIME-type identifier that identifies the portion as a data object identification request and/or otherwise identifies the portion for routing to a query handler component 402 operating in and/or otherwise on behalf of execution environment 401 of second node 504. Alternatively or additionally, the data object identification request may have structure and/or content that is valid and identifiable according to a schema for defining and/or otherwise identifying valid data object identification requests. A query handler component, may be provided as a type of content handler component, in an aspect. Alternatively or additionally, a query handler component may interoperate with one or more content handler components 413 to detect a data object identification request in a message received by a content manager component.

As such, query handler component 402 may operate along with other content handler components 413 to process data representations received in the message 706 from execution environment 401 of first node 502. Query handler component 402 may also provide transformed data from the representations to one or more user interface element handler components 415. Query handler component 402 operates to validate and process data object identification requests according to a schema defining valid data object identification requests. Various portions of a message including a data object identification request may be provided to one or more content handler components 413, including query handler component 402, to interoperate with presentation controller component 417 in execution environment 401 of second node 504 to present some or all of the received message, including the data object identification request.

Figure 6D:
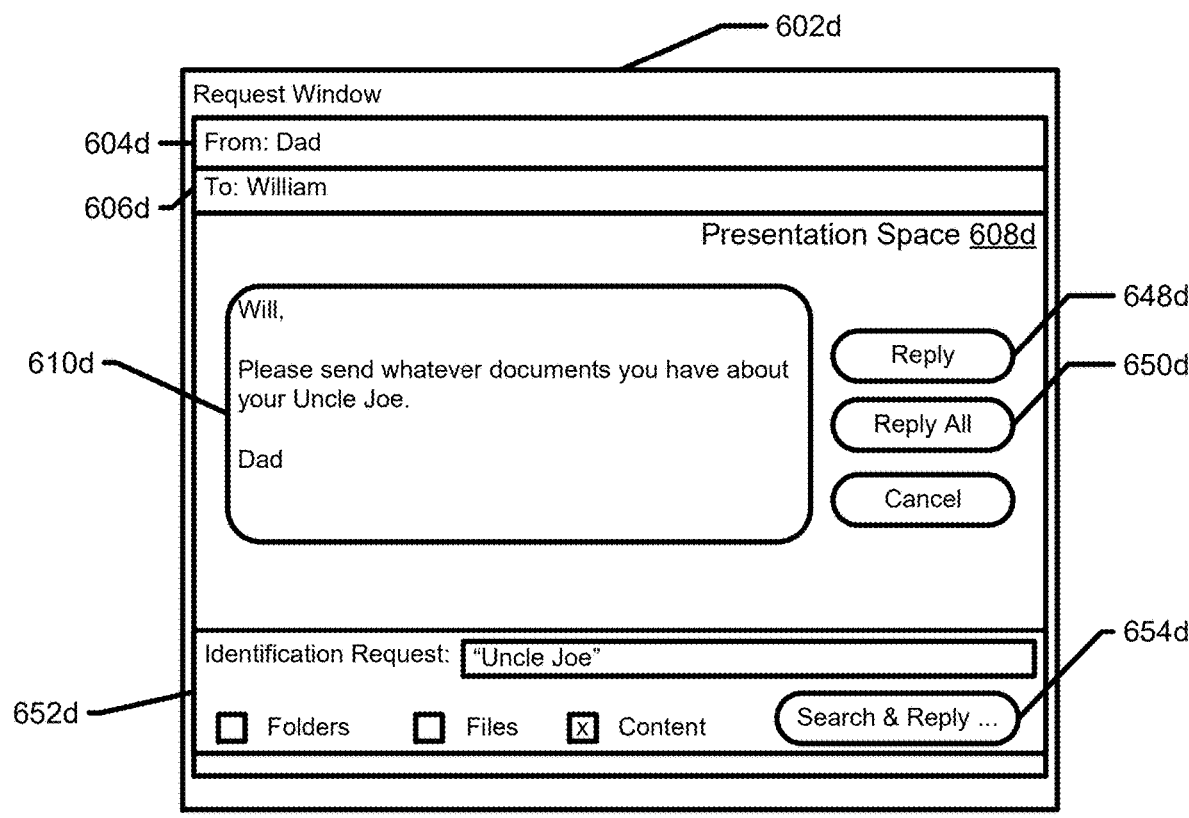
FIG. 6D is a diagram illustrating a user interface presented via a display according to another aspect of the subject matter described herein.

FIG. 6D illustrates a window, request window UI element 602d, presenting an exemplary representation of a message received from execution environment 401 of first node 502 in a communication with second node 504. As in FIG. 6A, request window UI element 602d includes a contactor UI element 604d, a contactee UI element 606d, a presentation space 608d of the request window UI element 602d that includes a user message UI element 610d including a text portion of the message provided by the communicant represented by execution environment 401 of first node 502. The various UI elements may be presented by one or more UI element handler components 415 in communications agent 403 operating in execution environment 401 of second node 504. A reply UI element 648d and a reply all UI element 648d are illustrated as exemplary UI elements in presentation space 608d presented to allow a user of execution environment 401 of second node 504 to respond and/or otherwise perform an operation based on the received message. FIG. 6D illustrates a data object identification request UI interface element 652d where the data object identification request identified in the message from execution environment 401 of first node 502 is represented to the communicant represented by the execution environment 401 of second node 504. In an aspect, the communicant is allowed to authorize the request by providing an input corresponding to a search and reply UI element 654d. In another aspect, the communicant may be allowed to modify the received data object identification request.

Figure 6E:
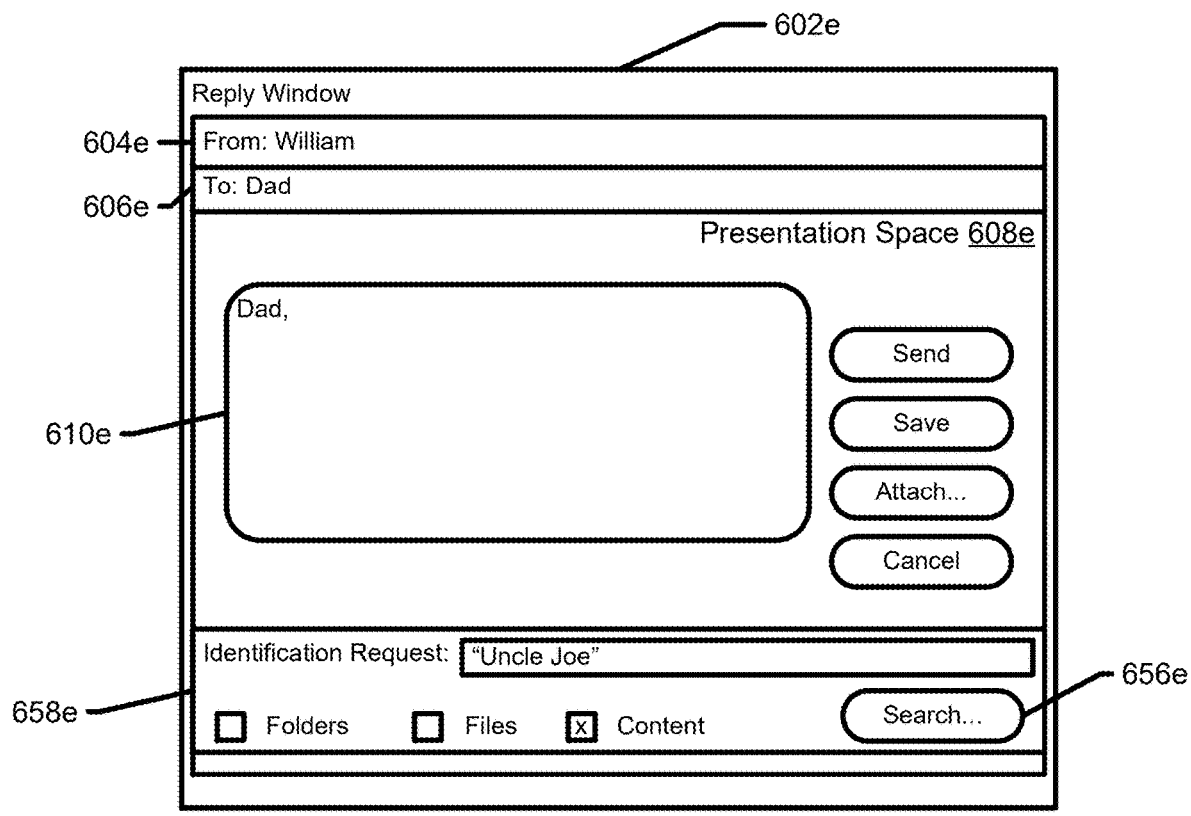
FIG. 6E is a diagram illustrating a user interface presented via a display according to another aspect of the subject matter described herein.

FIG. 6E, illustrates a reply window UI element 602e that, in an aspect, may be presented by communications agent 403 in execution environment 401 of second node 504 in response to an user input corresponding to reply UI element 648d detected by a corresponding UI element handler component 415. In an aspect, a user of communications agent 403 operating in in execution environment 401 of second node 504 may provide input authorizing some or all of the processing of a data object identification request. Reply window UI element 602e in FIG. 6E includes a search UI element 656e for receiving user input authorizing and/or otherwise instructing execution environment 401 of second node 504 to locate data objects that match the data object identification request, illustrated in a data object identification requested UI element 658e.

As described herein in an aspect, content manager component 409 may detect content type information to detect a data object identification request in a communication. For example, the message portion illustrated in FIG. 8A may be received in first message 706. Content manager component 409 may detect "application/id-request" MIME type identifier in content-type header 804a. The "application/id-request" MIME type identifier may be defined to identify a data object identification request based on one or more matching criteria for identifying a requested data object. Content manager component 409 may identify data object identification request portion 802a as including the data object identification request.

In response to detecting a data object identification request in first message 706, content manager component 409 may provide some or all of the data object identification request to query handler component 402. For example, query handler component 402 may be configured to operate according to a schema defining a format and/or a vocabulary for an XML-based language for id-request documents. Content manager component 409 may provide id-request document 806a, as a data object identification request, to query handler component 402. Query handler component 402 may operate according to the id-request schema. In an aspect, a query handler component may process more than one data object identification request content type. Alternatively or additionally, execution environment 401 may include multiple query handler components 402 for supporting multiple data object identification request content types.

Returning to FIG. 2B, a block 216 illustrates that the method yet further includes generating, in response to detecting the data object identification request, a data object identification response that identifies a data object in a second data store in the second execution environment, wherein the data object is identified by processing the data object identification request. Accordingly, a system for processing a data object identification request in a communication includes means for generating, in response to detecting the data object identification request, a data object identification response that identifies a data object in a second data store in the second execution environment, wherein the data object is identified by processing the data object identification request. For example, the arrangement in FIG. 3B, includes query director component 312 that is operable for generating, in response to detecting the data object identification request, a data object identification response that identifies a data object in a second data store in the second execution environment, wherein the data object is identified by processing the data object identification request. FIG. 4 illustrates query director component 412 as an adaptation and/or analog of query director component 312 in FIG. 3B. One or more query director components 412 operate in an execution environment 401. The system for query director includes one or more processors and logic encoded in one or more tangible media for execution by the one or more processors that when executed is operable for generating, in response to detecting the data object identification request, a data object identification response that identifies a data object in a second data store in the second execution environment, wherein the data object is identified by processing the data object identification request. In FIG. 4, a query director component 412 is illustrated as a component of application 403.

FIG. 7 includes dataflow message 712 that illustrates a create data object identification response data flow to process results returned from search dataflow 710. In FIG. 4, dataflow message 712 in FIG. 7 may represent data exchanged between query handler component 402 and query director component 412 to process results returned from a search operation performed based on the data object identification request, as illustrated by dataflow message 710. Processing the results may include creating and/or otherwise constructing a data object identification response to the data object identification request identified in first message 706. Dataflow message 712 may be internal to execution environment 401 of second node 504 and/or may include inter-operation by execution environment 401 of second node 504 via a network with another node.

Figure 6F:
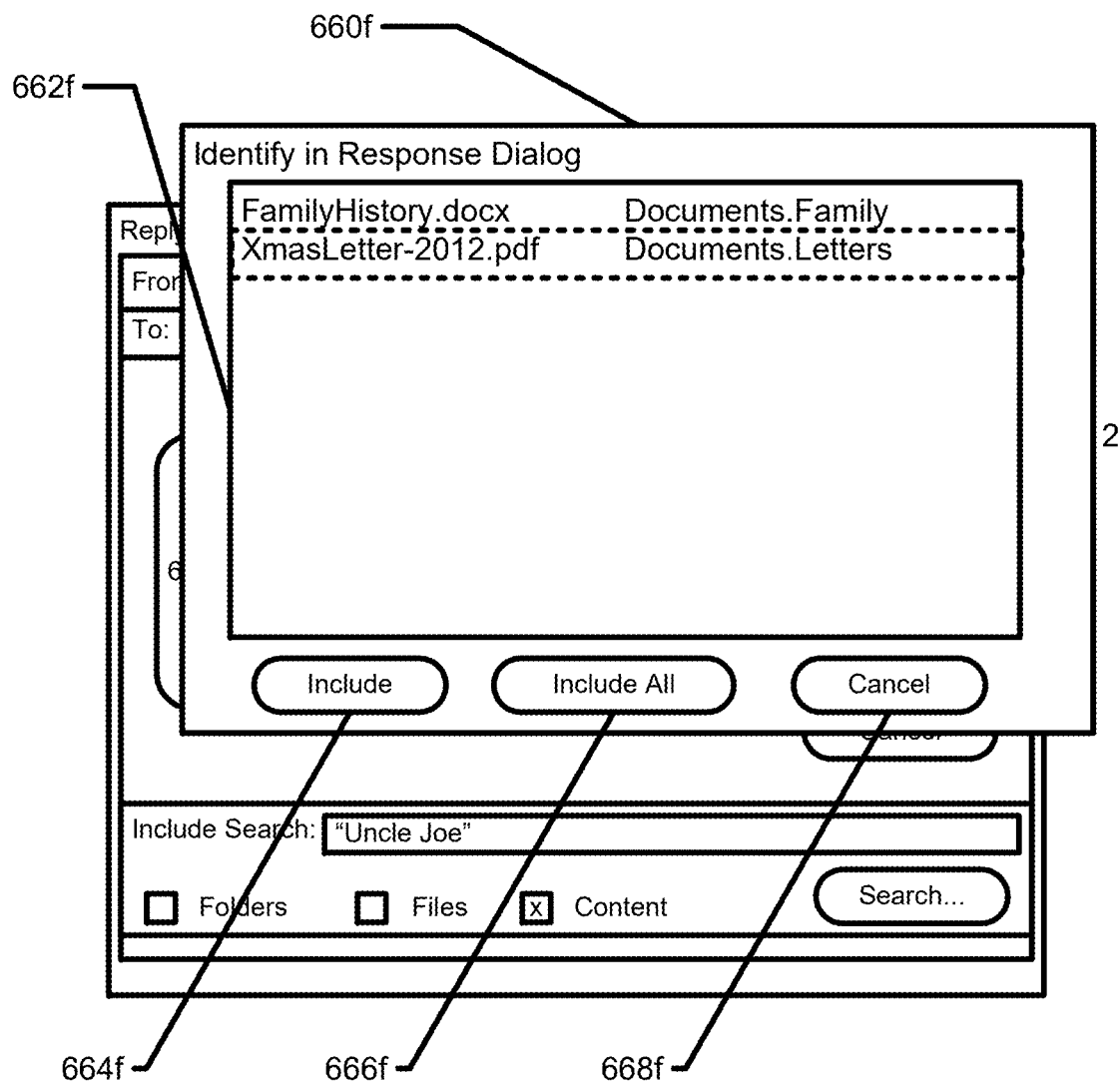
FIG. 6F is a diagram illustrating a user interface presented via a display according to another aspect of the subject matter described herein.
Figure 6G:
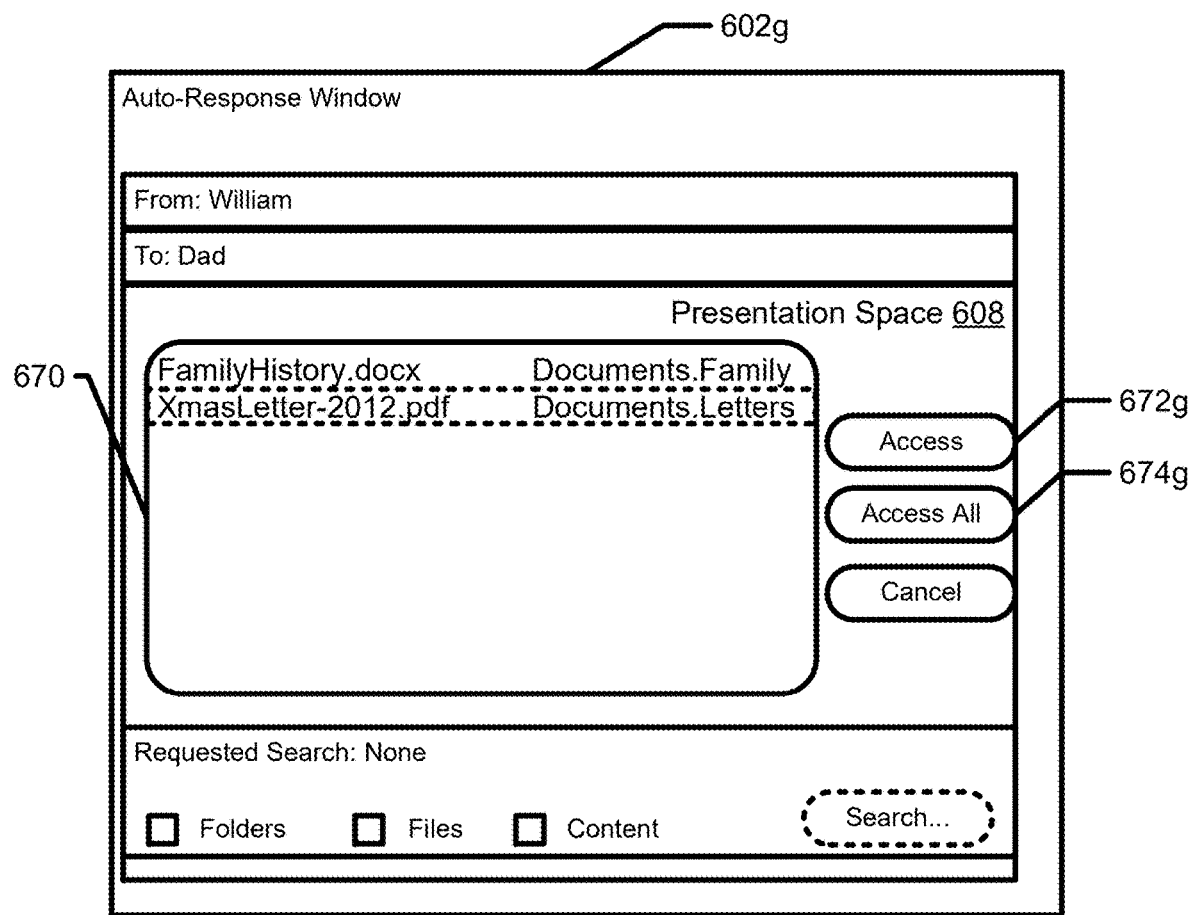
FIG. 6G is a diagram illustrating a user interface presented via a display according to another aspect of the subject matter described herein.

FIG. 6F, illustrates an identify in response dialog UI element 660ƒ that, in an aspect, may be presented by communications agent 403 in execution environment 401 of second node 504 in response to processing the data object identification request to locate matching data objects. In an aspect, a user of communications agent 403 operating in execution environment 401 of second node 504 may provide input corresponding to search UI element 656e in reply window UI element 602e in FIG. 6E. A corresponding UI element handler component 415 may operate to invoke query director component 412 to perform and/or otherwise to provide for performing one or more operations to locate one or more data objects based on the data object identification request. Query director component 412 may interoperate with one or more UI element handlers 415, directly or indirectly via query handler component 402, in an aspect, to present the UI element 660ƒ and its contents. Identify in response dialog UI element 660ƒ includes results pane UI element 662ƒ including representations of two data objects located and/or otherwise identified by query director component 412 based on the data object identification request. A user may select one or more data objects to identify in a data object identification response. An include UI element 664ƒ may be presented, as illustrated, to allow a user to instruct communications agent 403 to identify one or more selected data objects in results pane UI element 662ƒ in a data object identification response. An include all UI element 666ƒ is illustrated to allow for user input instructing communications agent 403 to identify all data objects represented in the UI element 660ƒ in a data object identification response in a communication with execution environment 401 of first node 502. A cancel UI element 668ƒ allows a user to end presentation of dialog UI element 660ƒ. A user may opt to identify no data objects represented in the dialog UI element 660ƒ and located and/or otherwise identified by query director component 412 based on the data object identification request.

Data objects located and/or otherwise identified by query director component 412 may be identified to IRB component 414 to construct and/or otherwise create a data object identification response identifying the data objects. As described above, in an aspect, a user may be allowed to select which data objects, if any, are to be identified in a data object identification response from one or more data objects located and/or otherwise identified by query director component 412 based on the data object identification response. In another aspect, communications agent 403 in FIG. 4 may invoke query director component 412 automatically to locate one or more data objects based on a data object matching criterion identified in a data object identification request and in response to detecting a data object identification request in a communication. In another aspect, communications agent 403 may invoke query director component 412 automatically to locate one or more data objects based on a data object identification request in a communication in response to detecting an indication to present, via a output device, some or all of a user message received in a message in the communication. Query director component 412 may be invoked and/or may operate based on the data object identification request and/or data object matching criterion identified to locate a data object prior to, during, and/or after other content received in the communication is processed.

The method illustrated in FIG. 2B may include additional aspects supported by various adaptations and/or analogs of the arrangement of components in FIG. 4. As described above, in one aspect a data object may be located and/or otherwise identified automatically in response to detecting the data object identification request. In another aspect, locating a data object may include presenting a locator UI element representing a data object identification request. Search UI element 656e in FIG. 6E exemplifies one type of locator UI control. Search UI element 656e may be presented by presentation controller component 417 as described above. A user input corresponding to a search UI element, such as search UI element 656e, may be detected by presentation controller component 417. Presentation controller component 417 may instruct query director component 412 to locate the data object based on a data object identification request represented by the data object identification request UI element 658e.

In another aspect, a data object identification request UI element may be presented to receive one or more additional matching criteria from a user. Based on the data object identification request UI element and input from the user, query director component 412 may receive one or more additional data object matching criterion information and/or may receive input to modify a data object matching criterion identified in a received data object identification request. Query director component 412 may locate one or more data objects in response to receiving the additional criterion.

Returning to FIG. 2B, a block 218 illustrates that the method yet further includes sending a second message, via the network by the second communications agent to the first communications agent, that includes the data object identification response, wherein the second message does not include the data object. Accordingly, a system for processing a data object identification request in a communication includes means for sending a second message, via the network by the second communications agent to the first communications agent, that includes the data object identification response, wherein the second message does not include the data object. For example, the arrangement in FIG. 3B, includes identification response builder component 314 that is operable for sending a second message, via the network by the second communications agent to the first communications agent, that includes the data object identification response, wherein the second message does not include the data object. FIG. 4 illustrates identification response builder component 414 as an adaptation and/or analog of identification response builder component 314 in FIG. 3B. One or more identification response builder components 414 operate in an execution environment 401. The system for processing a data object identification request in a communication includes one or more processors and logic encoded in one or more tangible media for execution by the one or more processors that when executed is operable for sending a second message, via the network by the second communications agent to the first communications agent, that includes the data object identification response, wherein the second message does not include the data object. In FIG. 4, a identification response builder component 414 is illustrated as a component of application 403.

As described above, FIG. 7 includes second message dataflow message 714 illustrating second message sent via network 506 to execution environment 401 of first node 502 from execution environment 401 of second node 504. Second message 714 includes a data object identification response in response to the data object identification request from first node 502 received and/or otherwise identified in first message 706.

IRB component 414 may provide the data object identification response to content manager component 409 to include in a message, illustrated by second message 714. As described above, content manager component 409 may receive and/or otherwise identify various portions of a message, including a data object identification response, from one or more content handler components 413. The data object identification response may be provided to content manager component 409. As described above, content manager component 409 in execution environment 401 of second node 504 may package the one or more data representations including a representation of the data object identification response into the message formatted according to a suitable communications protocol. Communications protocol component 407 operating in execution environment 401 of second node 504 may send the data as a message in a communication with execution environment 401 of first node 502 according to the specification(s) of the communications protocol. Content manager component 409 may alternatively or additionally encode and/or otherwise transform one or more of the data representations for sending in a data stream such as voice stream and/or a video stream for communicating in the communication to the communications agent.

FIG. 8B illustrates an exemplary data object identification response described in detail above. Second message portion 802b illustrates a user message portion that may be included in second message 714. Note that a user message portion may be empty or absent in some aspects. Data object identification response portion 804b illustrates the data object identification response as a list of URIs identifying data objects in a file system of execution environment 401 of second node 504. User Message portion 802b and data object identification response portion 804b may be provided by respective content handler components 413 to content manager component 409. Content manager component 409 may construct the content as illustrated in FIG. 8B and/or otherwise provide for encoding, translating, combining, and/or otherwise preparing the content for sending in second message 714.

The methods illustrated in FIG. 2A-B may include additional aspects supported by various adaptations and/or analogs of the arrangement of components in FIG. 3A-B. In various aspects, a data object identification request may be based on a date, a time, a length of time, a file type, a database record key, content of the data object, a content type identifier, a format rule, a vocabulary, a role of a user, a security attribute, a location in a data store such as a file system, an attribute of an identified data object, a size, a task, a transaction, a state, a user, a group, a requester, a relationship including a requesting user and a responding user, a keyword, a tag, a folder, and/or a path portion of a data object identifier—to name a few examples.

In another aspect, a data object located and/or otherwise identified in response to receiving a data object identification request must meet match a query identified by the data object identification request. Alternatively or additionally, a data object identification request may include an instruction and/or input for generating a data object. Locating the data object may include generating the data object. Generating a data object may include creating the data object and/or may include modifying and/or otherwise transforming an existing data object. For example, execution environment 401 of second node 504 may include a template stored in a file system. A data object identification request may identify the template. A query handler component 402 may operate to identify a document or other data object that may be created, is being created, and/or has been created based on the template. In response to an access request, execution environment 401 of second node 504 may return the document.

As described above, in various aspects, a data object identification request may be detected and/or represented based on various syntaxes, grammars, vocabularies, and/or languages. For example, a data object identification request may be identified and/or represented according to a file system search syntax, a regular expression language, a structured query language (SQL) query, a universal data object identifier schema, an XPATH based language, an XQuery based language, an XML based language, an HTML based language (form-based), and/or a keyword-value pair based language.

A data object identification request in a communication may be communicated via a network according to a first communications protocol. A user message may be exchanged between communicants in the communication via a second communications protocol. For example, a data object identification request may be sent on behalf of a first communicant by execution environment 401 of first node 502 including a communications agent 403 representing the first communicant. The data object identification request may be included in a communication along with a text message sent to the execution environment 401 of second node 504. The communicants represented by the execution environment 401 of first node 502 and the execution environment 401 of second node 504 may communicate via one or more exchanges of audio exchanged via, for example, a voice over IP (VOIP) communications protocol.

Exemplary data objects that may be requested via a data object identification request include a file, a program component, a data base record, video data, audio data, markup language, binary data, text data, an output of a service. Requested data objects may be pre-existing, volatile, and/or generated in response to the request.

As described above, receiving data object information may include receiving, via network from a node that received the data object information from the user, a message that identifies the data object information. For example, data object information may be received from a browser by a web server.

Data object information and/or a data object identification request may be generated, detected, and/or otherwise processed according to a schema that identifies at least one of a rule and a vocabulary that defines a valid data object identification request. Similarly, a data object identification response, an access request, and a response to an access request may be generated, detected, and/or otherwise processed according to a schema. One or more schemas may alone or together define one or more of valid data object information, a data object identification request, data object identification response, an access request, and/or an access response. A schema, as just described, may be identified based on data received and/or otherwise identified by a node hosting a communications agent via the network from another node hosting a communications agent and/or from a path node included in a network path in the network communicatively coupling the node to one or more nodes that respectively host communications agents.

In a further aspect, multiple alternative schemas may be defined for each of data object information, data object identification requests, data object identification responses, access requests, an/or an access responses processing data object identification requests. A schema may be selected and/or otherwise identified from the multiple schemas by execution environment 401 of first node 502 and the execution environment 401 of second node 504 and/or based on information exchanged by the two nodes. For example, a schema may be selected by the first communicant and/or the second communicant. One may inform the other, via a communications protocol and/or via any other suitable means. The communicants may negotiate which schema to use via any suitable means.

The communications agents in execution environment 401 of second node 504 and execution environment 401 of first node 502 may select a schema For example, a schema may be identified and/or otherwise selected based on a communications protocol supported and/or a communications protocol not supported by one or both nodes. That is, in negotiating which communication protocol to use allowing communicants to exchange information, a schema may be identified. A schema may be identified and/or otherwise selected based on an attribute of the data object. A schema for identifying image data may be different than a schema for editable documents. A schema for identifying a data object in a first file system may be different than a schema for identifying a data object in a different file system.

As described above, data object information and/or a data object identification request may identify a scope that specifies all or some portion of one or more data stores for locating a data object. For example, A communications agent 403 in execution environment 401 of first node 502 may receive user input that identifies a folder in a file system of the execution environment 401 of second node 504 that defines a scope for locating a data object.

Data object information and/or a data object identification request may be represented in a representation that includes a complete or a portion of at least one of a keyword expression, a regular expression, an XQuery expression, an XPath expression, a file system path expression, and a structured query language statement.

Further as also described above, a data object identification request, a data object identification response, an access request, an/or an access response may be included in a message according to a schema that identifies the message as valid for a specified communications protocol. Those skilled in the art are aware that schemas for email differ from schemas for instant messages and from streamed audio, for example.

A data object identification request, a data object identification response, an access request, and/or an access response may be exchanged in a communication in which audio data and/or image data is also exchanged. Multimedia may be a packaged to include one or more data streams which may include text based data streams.

A data object identification request, a data object identification response, an access request, and/or an access response may be included in an email, an instant message, a multi-media message, a short-message service message, and/or a data stream. The data stream may include audio data, image data, and/or text data.

A data object identification request, a data object identification response, an access request, an/or an access response may be included in and/or detected in a communication based on a location in the communication and/or based on a marker, such as an identifier in the communication that identifies a location for the data object identification request, the data object identification response, the access request, and/or the access response. The location may be absolute, such as fixed number of bytes or fields from the start or end of a message. Alternatively or additionally, the location may be identified by a location relative to another detectable portion of the communication. FIGS. 8A-B illustrate the use of MIME type identifiers as markers that identify locations for one or more of a data object identification request, a data object identification response, an access request, an/or an access response in a communication.

A data object identification request, a data object identification response, an access request, an/or an access response or respective portions thereof may include at least a portion of a keyword expression, a regular expression, expression including a Boolean operator, an expression including a precedence information, and a structured query language statement.

With respect to the method illustrated in FIG. 2B, the method as described above may include locating and/or otherwise identifying a data object automatically in response to receiving an access request that matches and/or otherwise identifies the data object. Further, a data object identification response may be created and/or otherwise generated automatically, in response to locating and/or otherwise identifying the data object.

In an aspect, in response to receiving and/or otherwise detecting a data object identification request, a user interface may be presented based on the data object identification request to prompt a user to process the data object identification request in some manner, such as authorizing the request and/or modifying the request by restricting its scope. In response to detecting user input targeting and/or otherwise corresponding to the presented user interface, one or more data objects may be located and/or otherwise identified based on the data object identification request.

A user may change a received data object identification request. One or more data objects may be located and/or otherwise identified based on the changed data object identification request.

In a further aspect, once one or more data objects are located and/or otherwise identified based on a data object identification request, a user interface may be presented to allow a user to identify the one or more data objects. User information may be received that selects one or more data objects to identify in a data object identification response and/or to not identify in the data object identification response. A user, in an aspect, may be allowed to identify a data object not located and/or otherwise identified by the user's node. The data object, based on the user input, is identified in the data object identification response.

In light of the description provided above, a data object identification response may be generated automatically in response to detecting a corresponding data object identification request by an execution environment 401 of first node 502. Further, the automatically generated data object identification response, may be sent to the node that sent the corresponding data object identification request, automatically in response to the generating of the data object identification response.

With respect to the method illustrated in FIG. 2A, the third message may be sent automatically in response to detecting the data object identification response. In another aspect, a representation of a received data object identification response may be presented, via an output device, to a user. The representation may identify one or more data objects located and/or otherwise identified based on the data object identification request. The representation may be presented automatically, in response to detecting the data object identification response. Further, a user input may be detected that corresponds to and/or otherwise targets the representation. The user input may be processed as an indication to retrieve the data object. As a result an access request may be created or otherwise generated that identifies the data object. The access request may be sent in a message via the network to retrieve the data object. The message may be sent to a node that sent the data object identification response and/or to another node. The third message may be sent by the communications agent in the execution environment 401 of first node 502 to the communications agent in the execution environment 401 of second node 504 via a communications protocol. The third message sent via the communication protocol may include a communications address, in an address space of the communications protocol, that identifies a user represented by the communications agent in the execution environment 401 of second node 504. The third message may include a data object identification request, a data object identification response, and/or a data object sent in response to previously receiving an access response by the execution environment 401 of first node 502. The third message may include an access request that identifies the data object. The access request may include a universal data object identifier (URI) that identifies the data object.

With respect to the method illustrated in FIG. 2B, in response to receiving an access request, a data object identified in the request may be sent. The data object may be sent automatically, in response to receiving the access request. The data object may be sent as attachment in a communication. The data object may be sent by a communications agent in the execution environment 401 of second node 504 to a communications agent in the execution environment 401 of first node 502 via a communications protocol. The data object may be sent via a communication that includes a communications address, in an address space of the communications protocol, that identifies the first communicant represented by the execution environment 401 of first node 502. The communication that includes the data object may include a data object identification request, a data object identification response, and/or an access request sent in response to a data object identification response sent previously by the first node.

The methods illustrated in FIGS. 2A-B may yet further include additional aspects supported by various adaptations and/or analogs of the arrangement of components in FIGS. 3A-B, respectively.

Performing the method illustrated in FIG. 2A and/or the method illustrated in FIG. 2B and/or any of its extension and/or in any of its aspects may include one or more of calling a function or method of an object, sending a message via a network; sending a message via an inter-process communication mechanism such as a pipe, a semaphore, a shared data area, and/or a queue; and/or receiving a request such as poll and responding to invoke, and sending an asynchronous message.

Output devices suitable for presenting a representation of a data object and/or a tag include a visual output device, an audio output device, and a tactile output device. One output device may present a data object and another output device may present a tag with which the data object is tagged.

Any action included in performing the method illustrated in FIG. 2A as well as any action included in in performing the method illustrated in FIG. 2B may include sending and/or receiving a message via a network. Further, a message, included in performing any of the subject matter described herein and/or any of its extensions in any of its aspects, may an asynchronous message without a corresponding request.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a non-transitory computer readable medium for use by or in connection with an instruction execution machine, system, apparatus, or device, such as a computer-based or processor-containing machine, system, apparatus, or device. As used here, a "non-transitory computer readable medium" may include one or more of any suitable media for storing the executable instructions of a computer program in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. A non-exhaustive list of conventional exemplary non-transitory computer readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-ray™ disc; and the like Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A method, comprising:
   causing, at a first node, display of:
      a first user interface (UI) element, for collecting information associated with at least one folder,
      a second user interface element, for collecting at least one object associated with at least one network communication address, the at least one object associated with at least one network communication address being the at least one network communication address or an alias associated with the at least one network communication address, and
      a third user interface element, for detecting an indication of a selection thereof to cause an initiation of a sharing of the at least one folder;
   causing, at a second node, receipt of at least one network communication, based on the information associated with the at least one folder, the at least one object associated with the at least one network communication address, and the detection of the indication of the selection of the third user interface element to cause the initiation of the sharing of the at least one folder, where the at least one network communication:
      identifies the information associated with the at least one folder that is collected using the first user interface (UI) element,
      includes an Hypertext Transfer Protocol (HTTP) link,
      does not include a file attachment, for avoiding at least one file from being communicated to and stored at the second node until an initiation of communication of the at least one file by a user of the second node is detected and the communication of the at least one file commences,
      is at least partially pre-written, and
      is automatically caused to be received without requiring user involvement after the detection of the indication of the selection of the third user interface element to cause the initiation of the sharing of the at least one folder;
   based on a detection of an indication that the HTTP link of the at least one network communication has been selected, causing, at the second node, receipt, from the second node and at at least one server, of a signal for causing creation of a first representation of the at least one folder, in a location among one or more folders, that is stored at the at least one server and that is displayable via at least one web page;
   causing, at the second node, receipt of the at least one web page, that results in display, at the second node and via the at least one web page, the first representation of the at least one folder that is stored at the at least one server; and
   causing, at the second node, receipt of code for storage at the second node and cooperation with a file explorer interface of a client-based file explorer application, for being utilized to:
   cause creation of a second representation of the at least one folder, in a location among one or more folders, that is stored at the second node and that is displayable via the file explorer interface of the client-based file explorer application, where first metadata corresponding to the least one folder that is stored at the at least one server is synchronized, utilizing the code, with second metadata corresponding to the at least one folder that is stored at the second node.

2. The method of claim 1, wherein the creation of the second representation of the at least one folder is caused, based on the first metadata.

3. The method of claim 1, wherein the HTTP link is included in a hyperlink in the at least one network communication.

4. The method of claim 3, wherein the hyperlink is included in Hypertext Markup Language (HTML) included in the at least one network communication, the hypertext HTML specifying a user-selectable input control presented in the at least one network communication.

5. The method of claim 1, wherein the signal includes an HTTP request.

6. The method of claim 1, wherein the one or more folders is stored at the at least one server and is associated with a communicant by of the second node.

7. The method of claim 1, wherein, at a time of sending, to the at least one server, of the signal, one or more representations for the one or more folders that is stored at the at least one server and one or more representations for the one or more folders that is stored at the second node, already exist.

8. The method of claim 1, wherein the synchronization is via a network file system or a network file system protocol.

9. The method of claim 1, wherein the second representation is created based on the synchronization.

10. The method of claim 1, wherein at least a portion of the second metadata is caused to be cached at the second node.

11. The method of claim 1, wherein at least a portion of contents of the at least one folder is caused to be cached at the second node.

12. The method of claim 1, and further comprising:
at the second node:
detecting a change to the first representation of the at least one folder, such that, based on the change, the second representation of the at least one folder is displayed to be changed via the file explorer interface of the client-based file explorer application, in response to an access thereto via the file explorer interface of the client-based file explorer application.

13. The method of claim 1, and further comprising:
at the second node:
detecting a change to first contents of the at least one folder associated with the second representation, such that, based on the change, second contents of the at least one folder associated with the first representation is displayed to be changed via one or more web pages, in response to an access thereto via the one or more web pages.

14. The method of claim 1, wherein the network communication and the file explorer interface are displayed via separate interfaces for permitting access to the at least one folder via multiple different interfaces, including the file explorer interface and a web page interface of the at least one web page, based on the detection of the indication that the HTTP link has been selected.

15. The method of claim 1, wherein a plurality of file representations are caused to be created and displayed in the second representation of the at least one folder, such that all created file representations require receipt of an indication of a user selection thereof before any files associated therewith are downloaded to the second node.

16. The method of claim 1, wherein a plurality of file representations are caused to be created and displayed in the second representation of the at least one folder, such that all created file representations require receipt of an indication of a user selection thereof before any files associated therewith are downloaded to the second node, for avoiding any and all files from being communicated to and stored at the first node until the receipt of the indication of the user selection.

17. The method of claim 1, wherein any and all files are automatically avoided from being communicated to and stored at the second node until a user selection of any created and displayed file representation thereof.

18. The method of claim 1, wherein any and all files are avoided from being communicated to and stored at the second node until a user selection of a created and displayed object representation.

19. The method of claim 1, wherein an initial display of the first representation of the at least one folder permits access to a file representation of the at least one file, such that, at a time when the first representation of the at least one folder is initially opened, the at least one file, that is represented by the file representation, is stored at the at least one server without being stored at the second node.

20. The method of claim 1, wherein an initial display of the second representation of the at least one folder permits access to a file representation of the at least one file, such that, at a time when the second representation of the at least one folder is initially opened, the at least one file, that is represented by the file representation, is stored at the at least one server without being stored at the second node.

21. The method of claim 1, wherein the one or more folders is stored at the at least one server and is generated by a communicant of the second node.

22. The method of claim 1, wherein any and all files associated with the at least one folder are automatically avoided from being communicated to and stored at the second node before detection of a user selection of a file representation.

23. The method of claim 1, wherein the location among the one or more folders in which the first representation of the at least one folder is created, and the location among the one or more folders in which the second representation of the at least one folder is created, are logically the same and physically different.

24. The method of claim 1, wherein the at least one file is automatically identified based on a key word received at the first node.

25. The method of claim 1, wherein one or more other files are automatically identified, for storage in the at least one folder, based on a key word received at the first node.

26. The method of claim 1, wherein one or more other files stored at the second node are automatically identified, for storage in the at least one folder, based on a key word received at the first node.

27. The method of claim 1, wherein one or more other files stored at the second node are automatically identified, for storage in a subfolder of the at least one folder, based on a key word received at the first node.

28. The method of claim 1, wherein one or more other files stored at the first node are automatically identified, for storage in the at least one folder, based on a key word received at the first node.

29. The method of claim 1, wherein the first representation of the at least one folder includes a particular folder name that is based on at least one aspect of the at least one file.

30. The method of claim 1, wherein the second representation of the at least one folder includes a particular folder name that is based on at least one aspect of the at least one file.

31. The method of claim 1, wherein the first representation of the at least one folder includes a particular folder name that is based on at least one aspect of the at least one file, and the at least one file is automatically identified for inclusion in the at least one folder based on a keyword received from a user of the first node.

32. The method of claim 1, wherein the first representation of the at least one folder includes a particular folder name that is based on at least one aspect of the at least one file, and the at least one file is automatically identified for inclusion in the at least one folder based on keywords received from a user of the first node based on the detection of the indication that the HTTP link of the at least one network communication has been selected.

33. The method of claim 1, wherein the first representation of the at least one folder and the second representation of the at least one folder both include a particular folder name that is based on at least one aspect of the at least one file, and the at least one file is automatically identified for inclusion in the at least one folder based on keywords received from a user of the first node.

34. The method of claim 1, wherein the second representation of the at least one folder includes a particular folder name that is based on at least one aspect of the at least one file, and the at least one file is automatically identified for inclusion in the at least one folder based on a keyword received from a user of the first node in response to the detection of the indication that the HTTP link of the at least one network communication has been selected.

35. The method of claim 1, wherein the first representation of the at least one folder includes a particular folder name that is based on at least one aspect of the at least one file, the at least one file is automatically identified for inclusion in the at least one folder based on a keyword received from a user of the first node, and the at least one file is automatically reformatted in connection with the automatic identification thereof.

36. The method of claim 1, wherein the first representation of the at least one folder includes a particular folder name that is based on at least one aspect of the at least one file, the at least one file is automatically identified for inclusion in the at least one folder based on a keyword received from a user of the first node in response to the detection of the indication that the HTTP link of the at least one network communication has been selected, and the at least one file is automatically reformatted.

37. The method of claim 1, wherein the second representation of the at least one folder includes a particular folder name that is based on at least one aspect of the at least one file, the at least one file is automatically identified for inclusion in the at least one folder based on a keyword received from a user of the first node, and the at least one file is automatically reformatted.

38. The method of claim 1, wherein the first representation of the at least one folder and the second representation of the at least one folder both include a particular folder name that is based on at least one aspect of the at least one file, the at least one file is automatically identified for inclusion in the at least one folder based on a keyword received from a user of the first node in response to the detection of the indication that the HTTP link of the at least one network communication has been selected, and the at least one file is automatically reformatted in connection with the automatic identification thereof.

39. The method of claim 1, wherein at least one of:
the at least one object associated with the at least one network communication address is received separately from the indication to share the at least one folder;
the at least one object associated with the at least one network communication address is not received separately from the indication to share the at least one folder;
the at least one network communication address includes an email address;
the at least one server is configured to control whether the second node stores or does not store the at least one file;
the at least one server is configured to not control whether the second node stores or does not store the at least one file;
the code is configured to control whether the second node stores or does not store the at least one file;
the code is configured to not control whether the second node stores or does not store the at least one file;
the causing, at the second node, the receipt, from the second node and at the at least one server, of the signal, is based on the detection of the indication that the HTTP link of the at least one network communication has been selected, by the causing being initiated in response to the detection of the indication that the HTTP link of the at least one network communication has been selected;
the causing, at the second node, the receipt, from the second node and at the at least one server, of the signal, is caused at the second node, by the second node sending the signal for receipt at the at least one server;
the causing, at the second node, the receipt, from the second node and at the at least one server, of the signal, is caused at the second node, by the second node sending another signal that causes the signal for receipt at the at least one server;
the causing, at the second node, the receipt, from the second node and at the at least one server, of the signal, is caused at the second node, by the second node directly causing the signal for receipt at the at least one server;
the causing, at the second node, the receipt, from the second node and at the at least one server, of the signal, is caused at the second node, by the second node indirectly causing the signal for receipt at the at least one server;
the receipt, from the second node and at the at least one server, of the signal, is caused by the second node sending the signal for receipt at the at least one server;
the receipt, from the second node and at the at least one server, of the signal, is caused by the second node sending another signal that causes the signal to be sent for receipt at the at least one server;
the at least one web page includes HTML;
the at least one web page does not include HTML;
the first network communication includes HTML;
the first network communication does not include HTML;
the second network communication includes HTML;
the second network communication does not include HTML;
the least one folder that is stored at the at least one server is logically the same as the at least one folder that is stored at the second node;
the least one folder that is stored at the at least one server is physically different from the at least one folder that is stored at the second node;
the first representation of the at least one folder and the second representation of the at least one folder are caused to be created at different times;
the first representation of the at least one folder is caused to be created in the location among the one or more folders, by creating the first representation of the at least one folder in the location among representations of the one or more folders; or the second representation of the at least one folder is caused to be created in the location among the one or more folders, by creating the first representation of the at least one folder in the location among representations of the one or more folders.

40. The method of claim 1, wherein neither the first node, the second node, nor the at least one server communicate with an external messaging node.

41. The method of claim 1, wherein at least one of: the first node, the second node, or the at least one server communicates with an external messaging node.

42. The method of claim 1, and further comprising:
causing, at an external messaging node, at least one operation.

43. The method of claim 1, wherein the first node, the second node, and the at least one server are part of a system that does not include an external messaging node for communicating at least one of: the first network communication or the second network communication.

44. A method, comprising:
causing, at a first node, display of:
a first user interface element that includes a textbox, for collecting a file request description for at least one file,
a second user interface element, for enabling collection of an indication of at least one of a date or a time,
a third user interface element, for collecting at least one object associated with at least one network communication address, the at least one object associated with at least one network communication address being the at least one network communication address or an alias associated with the at least one network communication address, and
a fourth user interface element, for detecting an indication of a selection thereof to cause an initiation of a request for the at least one file;
causing, at a second node, receipt of a first network communication, based on the file request description for the at least one file, the at least one object associated with the at least one network communication address, and the detection of the indication of the selection of the fourth user interface element to cause the initiation of the request for the at least one file, where the first network communication includes:
at least one sentence including the file request description for the at least one file that is collected using the first user interface element, and
a fifth user interface element for detecting an indication of a selection thereof;
based on the detection of the indication of the selection of the fifth user interface element of the first network communication, causing, at the second node, display of:
a sixth user interface element, for collecting an indication of at least one file, and
a seventh user interface element, for detecting an indication of a selection thereof;
based on the detection of the indication of the selection of the seventh user interface element, causing, at the second node, sending, to at least one server, of a signal for causing creation of a first representation of the at least one file, in a location among one or more folders, that is stored at the at least one server and that is displayable via at least one web page;

causing, at the first node, receipt of a second network communication, based on the detection of the indication of the selection of the seventh user interface element, where the second network communication:
includes an eighth user interface element for detecting an indication of a selection thereof,
does not include a file attachment, for avoiding the at least one file from being communicated to and stored at the first node via the second network communication,
is at least partially pre-written, and
is automatically caused to be received without requiring further user involvement after the detection of the indication of the selection of the seventh user interface element;
based on the detection of the indication of the selection of the eighth user interface element of the second network communication, causing, at the first node, receipt of the at least one web page, that results in display, at the first node and via the at least one web page, of a file structure that permits access to the first representation of the at least one file stored at the at least one server; and
causing, at the first node, receipt of code for storage at the first node and cooperation with a file explorer interface of a client-based file explorer application, for being utilized to:
based on the detection of the indication of the selection of the eighth user interface element of the second network communication, cause creation of a second representation of the at least one file, in a location among one or more folders, that is stored at the first node and that is displayable via the file explorer interface of the client-based file explorer application, where first metadata corresponding to the least one file that is stored at the at least one server is synchronized, utilizing the code, with second metadata corresponding to the at least one file that is stored at the first node.

45. The method of claim 44, wherein any and all file representations of any and all requested files are caused to be created such that the at least one server requires receipt of an indication of a user download request before any requested file being downloaded to the first node.

46. The method of claim 44, wherein any and all file representations of any and all requested files are caused to be created to require receipt, by the at least one server, of an indication of a user selection thereof before any requested file being downloaded to the first node, for avoiding any and all requested files from being communicated to and stored at the first node until the receipt of the indication of the user selection.

47. The method of claim 44, wherein all file representations of all requested files are caused to be created and displayed to automatically require receipt of an indication of a user selection thereof before any requested file is downloaded to the first node.

48. The method of claim 44, wherein any file representation of any requested file is caused to be created to require receipt of an indication of a user selection before any requested file is downloaded to the first node.

49. The method of claim 48, wherein the second representation of the at least one file is caused to be created, in the location among one or more folders, that is stored at the first node and that is displayable via the file explorer interface of the client-based file explorer application, in response to the detection of the indication of the selection of the eighth user interface element of the second network communication.

50. The method of claim 44, wherein the second representation of the at least one file is caused to be created, in the location among one or more folders, that is stored at the first node and that is displayable via the file explorer interface of the client-based file explorer application, in response to the detection of the indication of the selection of the eighth user interface element of the second network communication, where the second network communication is an e-mail that includes the eighth user interface element.

51. The method of claim 44, wherein the second representation of the at least one file is caused to be created, in the location among one or more folders, that is stored at the first node and that is displayable via the file explorer interface of the client-based file explorer application, in response to the detection of the indication of the selection of the eighth user interface element of the second network communication.

52. The method of claim 44, wherein any and all requested files are automatically avoided from being communicated to and stored at the first node until a user selection of any created and displayed file representation thereof.

53. The method of claim 44, wherein any and all requested files are automatically avoided from being communicated to and stored at the first node until a user selection of a created and displayed object representation.

54. The method of claim 53, wherein the object representation includes a file representation.

55. The method of claim 53, wherein the object representation includes a folder representation.

56. The method of claim 44, wherein access to the at least one file is permitted via multiple different interfaces at the first node, including the file explorer interface and a web page interface of the at least one web page, only in response to the detection of the indication of the selection of the eighth user interface element of the second network communication.

57. The method of claim 44, wherein the creation of the second representation of the at least one file is caused, based on the first metadata.

58. The method of claim 44, wherein the one or more folders is stored at the at least one server and is associated with a communicant of the first node.

59. The method of claim 44, wherein the one or more folders is stored at the at least one server and is generated by a communicant of the first node.

60. The method of claim 44, wherein the synchronization is via a network file system.

61. The method of claim 44, wherein the second representation is created based on the synchronization.

62. The method of claim 44, wherein at least a portion of the second metadata is caused to be cached at the first node.

63. The method of claim 44, wherein an initial display of the file structure permits access to the first representation of the at least one file, such that, at a time when the file structure is initially displayed, the at least one file, that is represented by the first representation, is stored at the at least one server without being stored at the first node.

64. The method of claim 44, wherein any and all files, that are subject to the request for the at least one file, are automatically avoided from being communicated to and stored at the first node before detecting a user selection of a corresponding created and displayed file representation at the first node.

65. The method of claim 44, wherein the location among the one or more folders in which the first representation of the at least one file is created, and the location among the one or more folders in which the second representation of the at least one file is created, are logically the same and physically different.

66. The method of claim 44, wherein the at least one file is automatically identified based on a key word received at the first node.

67. The method of claim 44, wherein the at least one file is automatically identified based on a key word received in connection with the request for the at least one file.

68. The method of claim 44, wherein the at least one file is automatically identified based on a key word received at the first node, in response to receiving user input at the second node.

69. The method of claim 44, wherein the at least one file is automatically identified based on a key word received at the first node, based on the detection of the indication of the selection of the eighth user interface element of the second network communication.

70. The method of claim 44, wherein the at least one file is automatically identified based on a key word received in connection with the request for the at least one file, based on receiving user input at the second node.

71. The method of claim 44, wherein the at least one file is automatically identified based on a key word received in connection with the request for the at least one file, based on the detection of the indication of the selection of the eighth user interface element of the second network communication.

72. The method of claim 44, wherein the location among the one or more folders, in which the first representation of the at least one file is created, includes a particular folder named based on at least one aspect of the at least one file.

73. The method of claim 44, wherein the location among the one or more folders, in which the second representation of the at least one file is created, includes a particular folder named based on at least one aspect of the at least one file.

74. The method of claim 44, wherein the location among the one or more folders, in which the first representation of the at least one file is created, includes a particular folder, such that the at least one file is automatically identified for inclusion in the particular folder based on a keyword received from a user of the first node.

75. The method of claim 44, wherein the location among the one or more folders, in which the first representation of the at least one file is created, includes a particular folder, such that the at least one file is automatically identified for inclusion in the particular folder based on keywords received from a user of the first node, and the particular folder is named based on at least one aspect of the at least one file.

76. The method of claim 44, wherein the location among the one or more folders, in which the first representation of the at least one file is created, includes a particular folder, such that the at least one file is automatically identified for inclusion in the particular folder based on a keyword received from a user of the first node, the at least one file is automatically reformatted, and the particular folder is named based on at least one aspect of the at least one file.

77. The method of claim 44, wherein the location among the one or more folders, in which the second representation of the at least one file is created, includes a particular folder, such that the at least one file is automatically identified for inclusion in the particular folder based on keywords received from a user of the first node, and the particular folder is named based on at least one aspect of the at least one file.

78. The method of claim 77, wherein the at least one aspect of the at least one file, includes a location of the at least one file.

79. The method of claim 44, wherein the location among the one or more folders, in which the second representation of the at least one file is created, includes a particular folder, such that the at least one file is automatically identified for inclusion in the particular folder based on a keyword received from a user of the first node, the at least one file is automatically reformatted in connection with the automatic identification thereof, and the particular folder is named based on at least one aspect of the at least one file.

80. The method of claim 44, wherein at least one of:
the file description is received separately from the indication of at least one of the date or the time;
the file description is not received separately from the indication of at least one of the date or the time;
the method is configured to control the file description;
the method is configured to not control the file description;
the method is configured to control the file description such that the file description describes the at least one file in connection with the file request;
the method is configured to not control the file description such that the file description describes the at least one file in connection with the file request;
the method is configured to control the file description;
the method is not configured to control the file description;
the method is configured to control the file description such that the file description describes the at least one file in connection with the file request;
the method is not configured to control the file description such that the file description describes the at least one file in connection with the file request;
the method is configured to control whether the first node stores or does not store the at least one file;
the method is configured to not control whether the first node stores or does not store the at least one file;
the at least one web page includes HTML;
the at least one web page does not include HTML;
the at least one network communication includes HTML;
the at least one first network communication does not include HTML;
the code is configured to control whether the first node stores or does not store the at least one file;
the code is configured to not control whether the first node stores or does not store the at least one file; or
one or more representations of the one or more folders is stored at the at least one server and is displayable via at least one web page to appear the same as one or more representations of the one or more folders that is stored at the first node and that is displayable via the file explorer interface of the client-based file explorer application.

81. The method of claim 44, wherein neither the first node, the second node, nor the at least one server communicate with an external messaging node.

82. The method of claim 44, wherein at least one of: the first node, the second node, or the at least one server communicates with an external messaging node.

83. The method of claim 44, and further comprising:
causing, at an external messaging node, at least one operation.

84. The method of claim 44, wherein the first node, the second node, and the at least one server are part of a system that does not include an external messaging node for communicating at least one of: the first network communication or the second network communication.

* * * * *